(12) United States Patent
Ishigami et al.

(10) Patent No.: US 10,840,761 B2
(45) Date of Patent: Nov. 17, 2020

(54) STATOR AND ROTARY ELECTRIC MACHINE

(71) Applicant: HITACHI AUTOMOTIVE SYSTEMS ENGINEERING, LTD., Ibaraki (JP)

(72) Inventors: Takashi Ishigami, Tokyo (JP); Hiroshi Kanazawa, Ibaraki (JP); Kenji Nakayama, Ibaraki (JP)

(73) Assignee: HITACHI AUTOMOTIVE SYSTEMS ENGINEERING, LTD., Ibaraki (JP)

( * ) Notice: Subject to any disclaimer, the term of this patent is extended or adjusted under 35 U.S.C. 154(b) by 210 days.

(21) Appl. No.: 16/064,587

(22) PCT Filed: Oct. 24, 2016

(86) PCT No.: PCT/JP2016/081484
§ 371 (c)(1),
(2) Date: Jun. 21, 2018

(87) PCT Pub. No.: WO2017/110232
PCT Pub. Date: Jun. 29, 2017

(65) Prior Publication Data
US 2019/0027989 A1 Jan. 24, 2019

(30) Foreign Application Priority Data
Dec. 22, 2015 (JP) ................... 2015-249370

(51) Int. Cl.
*H02K 3/34* (2006.01)
*H02K 1/16* (2006.01)
(Continued)

(52) U.S. Cl.
CPC ............ *H02K 3/345* (2013.01); *H02K 1/16* (2013.01); *H02K 3/12* (2013.01); *H02K 3/34* (2013.01);
(Continued)

(58) Field of Classification Search
CPC ............ H02K 3/345; H02K 3/12; H02K 3/34; H02K 1/16; H02K 15/024; H02K 15/065; H02K 15/105
See application file for complete search history.

(56) References Cited

U.S. PATENT DOCUMENTS

2009/0085421 A1* 4/2009 Saito .................. H02K 3/12
310/214

FOREIGN PATENT DOCUMENTS

CN    204089399 U    1/2015
JP    03-30758 U    3/1991
(Continued)

OTHER PUBLICATIONS

International Search Report of PCT/JP2016/081484 dated Dec. 6, 2016.
(Continued)

*Primary Examiner* — Jue Zhang
(74) *Attorney, Agent, or Firm* — Mattingly & Malur, PC

(57) ABSTRACT

A stator includes: a stator core that includes a plurality of slots; a stator coil that is formed by connecting a plurality of segment conductors to each other; and an insulating member that has insulating properties, in which the segment conductor includes a slot portion and an inclined portion, the slot portion is disposed inside the slot, the inclined portion is disposed outside the slot to be inclined from the slot portion, the insulating member is mounted on the stator core and includes a first insulating portion and a plurality of second insulating portions, the first insulating portion is disposed (Continued)

next to the slot portion, the second insulating portions extend from the first insulating portion in an axial direction and are provided along a radial direction of the stator core, and the second insulating portions insulate adjacent segment conductors in an coil end from each other.

9 Claims, 16 Drawing Sheets

(51) Int. Cl.
    *H02K 3/12*     (2006.01)
    *H02K 15/02*     (2006.01)
    *H02K 15/06*     (2006.01)
    *H02K 15/10*     (2006.01)

(52) U.S. Cl.
    CPC ......... *H02K 15/024* (2013.01); *H02K 15/065* (2013.01); *H02K 15/105* (2013.01)

(56) References Cited

FOREIGN PATENT DOCUMENTS

| | | | |
|---|---|---|---|
| JP | 11-178292 A | | 7/1999 |
| JP | 2001-178057 A | | 6/2001 |
| JP | 2001178057 A | * | 6/2001 |
| JP | 2004-32964 A | | 1/2004 |
| JP | 2009-77468 A | | 4/2009 |
| JP | 2009-077468 A | | 4/2009 |
| JP | 2010-288405 A | | 12/2010 |
| JP | 2010288405 A | * | 12/2010 |
| JP | 2011-072071 A | | 4/2011 |
| JP | 2012-157225 A | | 8/2012 |
| JP | 2015-139247 A | | 7/2015 |
| JP | 2015139247 A | * | 7/2015 |
| JP | 2016-046890 A | | 4/2016 |

OTHER PUBLICATIONS

Chinese Office Action received in corresponding Chinese Application No. 201680075530.X dated May 13, 2020.

* cited by examiner

[FIG. 1]
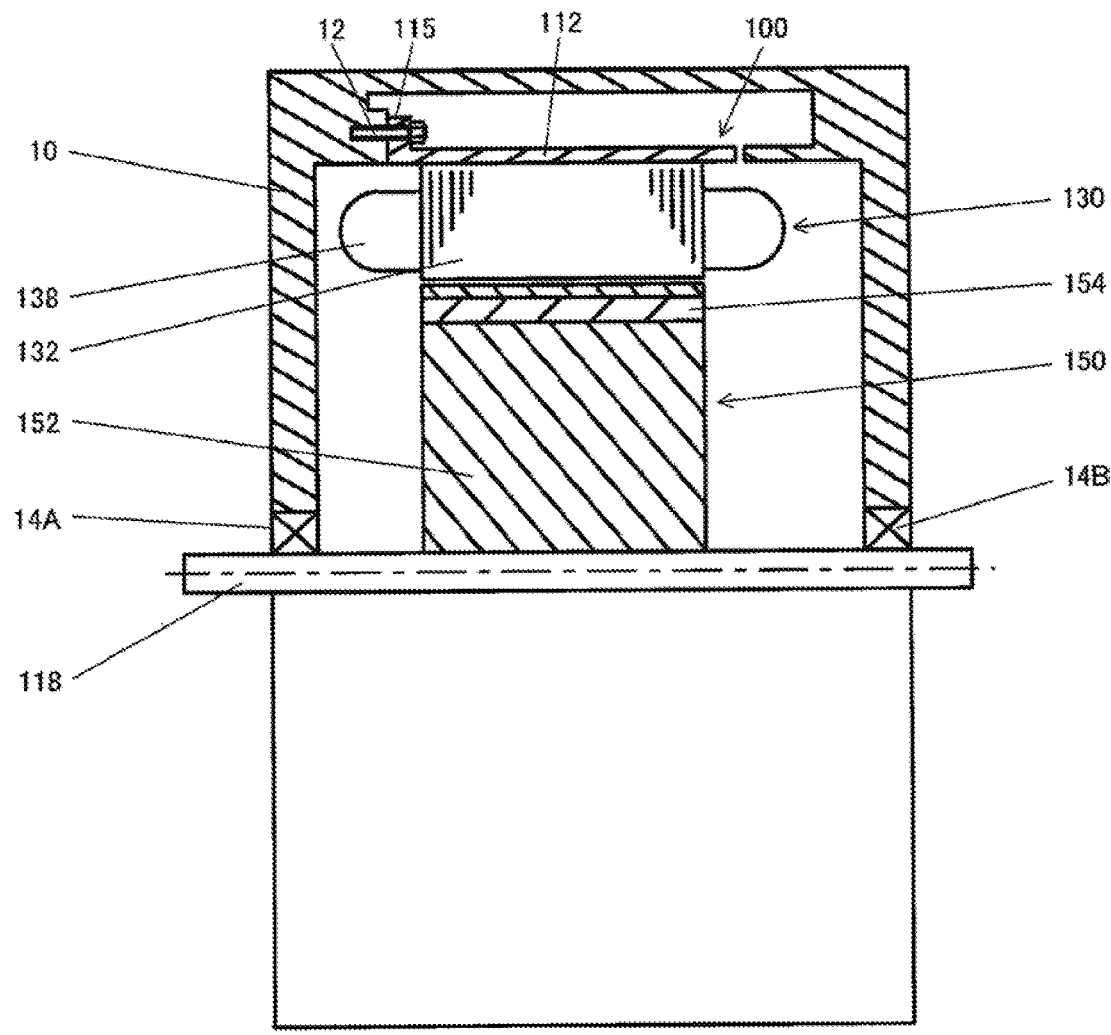

[FIG. 2]
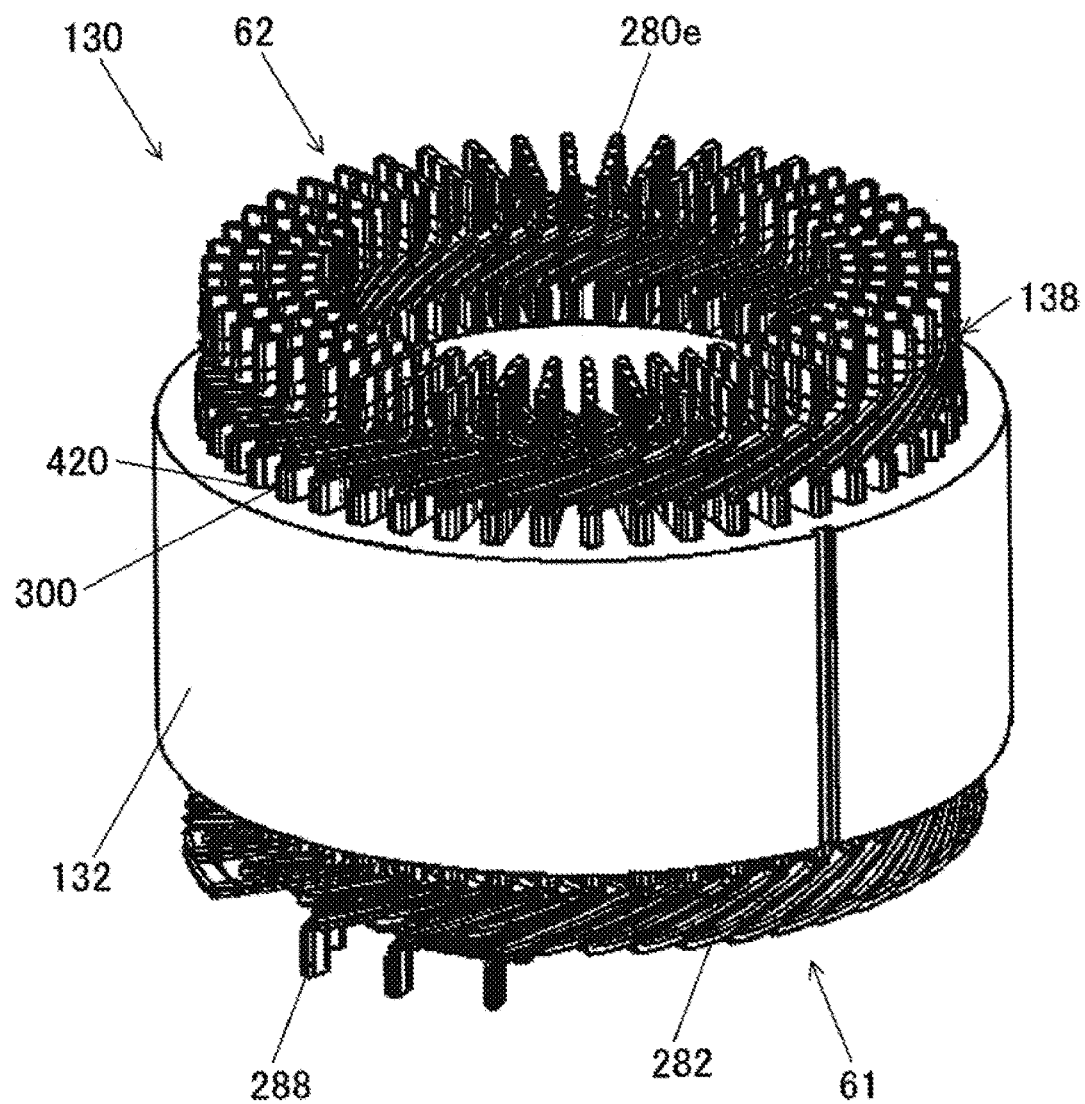

[FIG. 3]
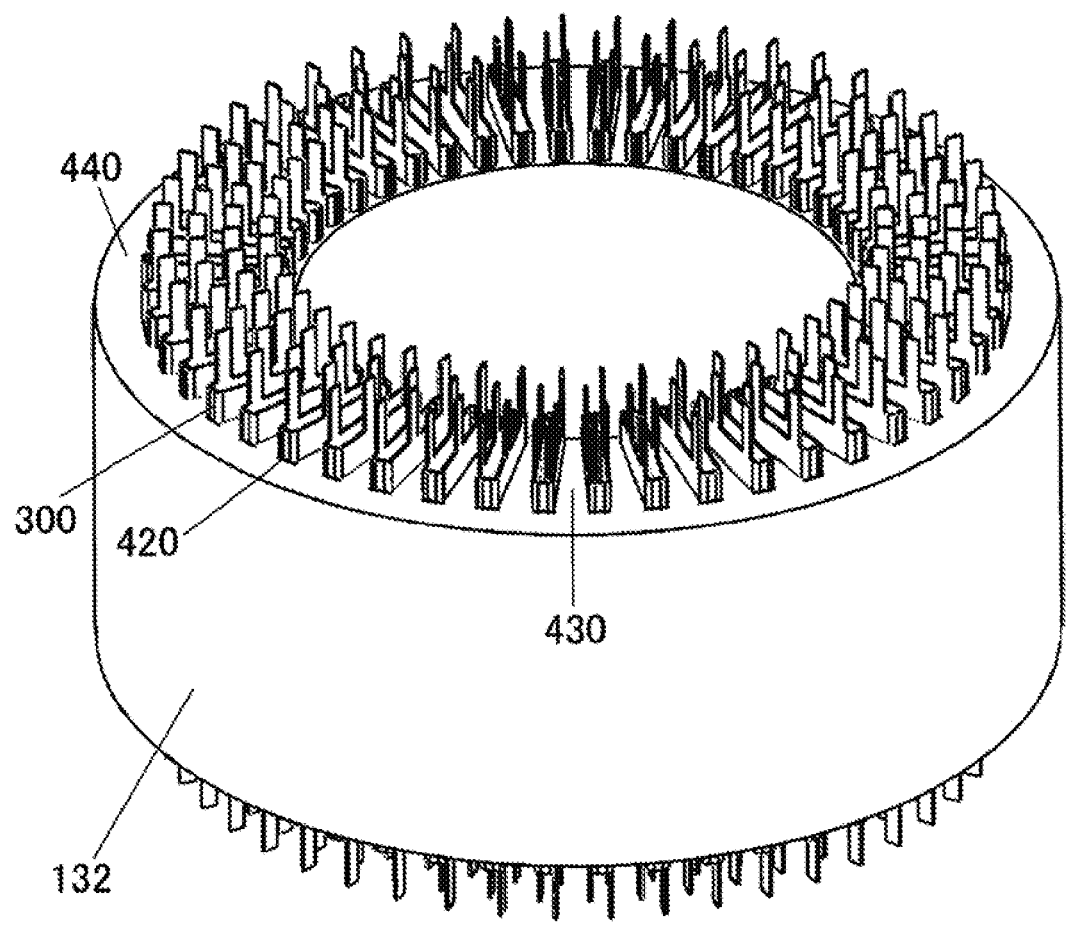

[FIG. 4]
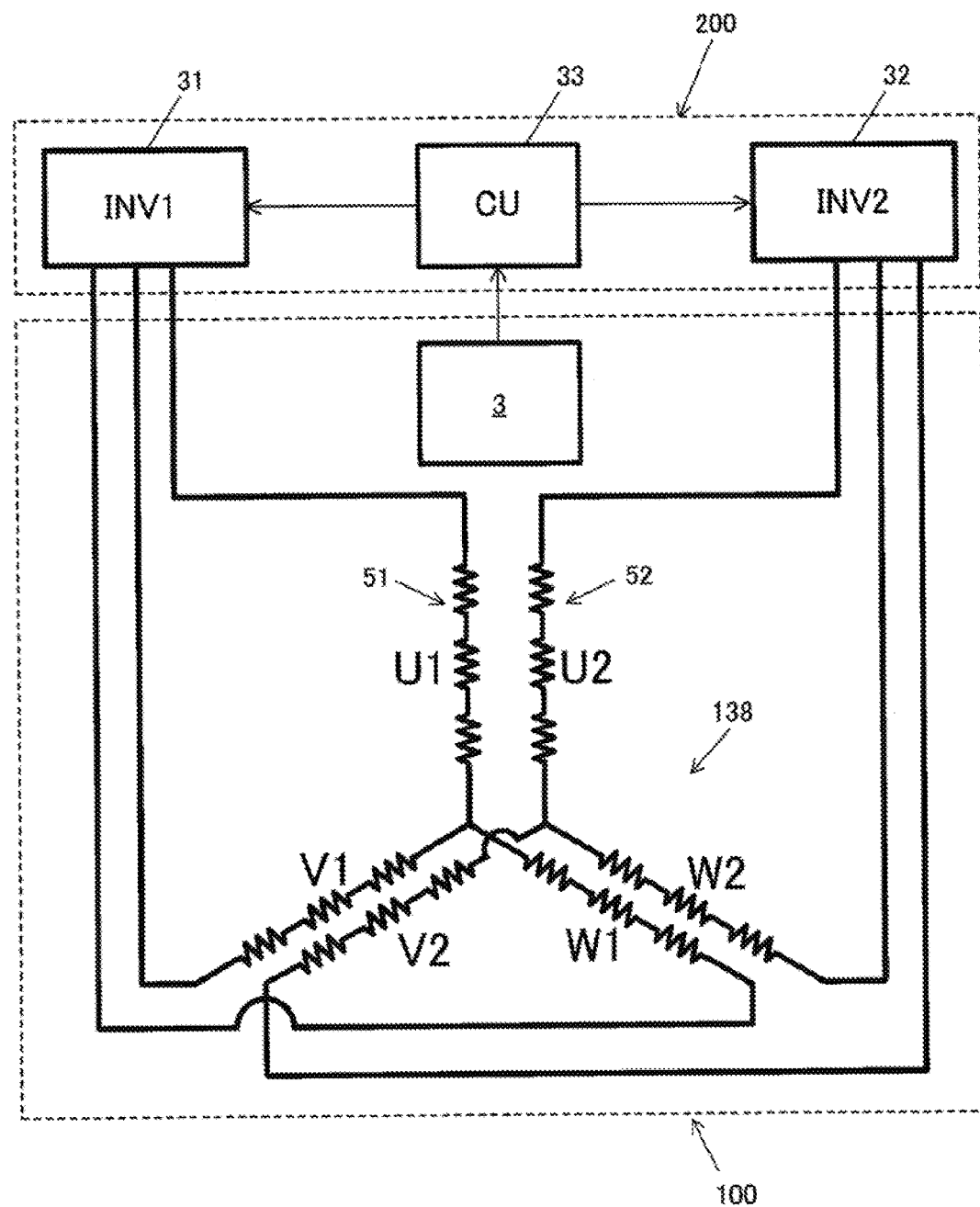

[FIG. 5]
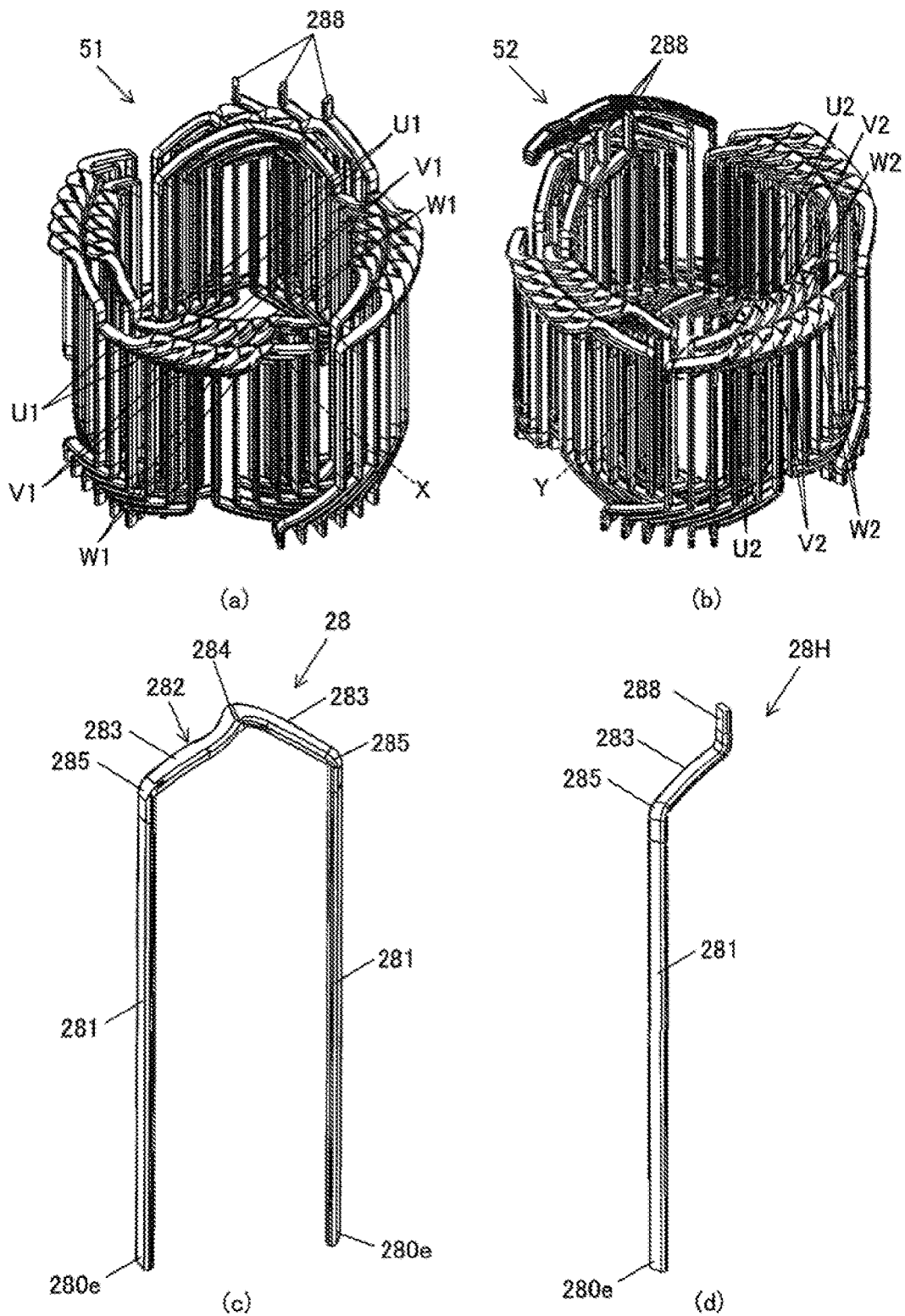

[FIG. 6]
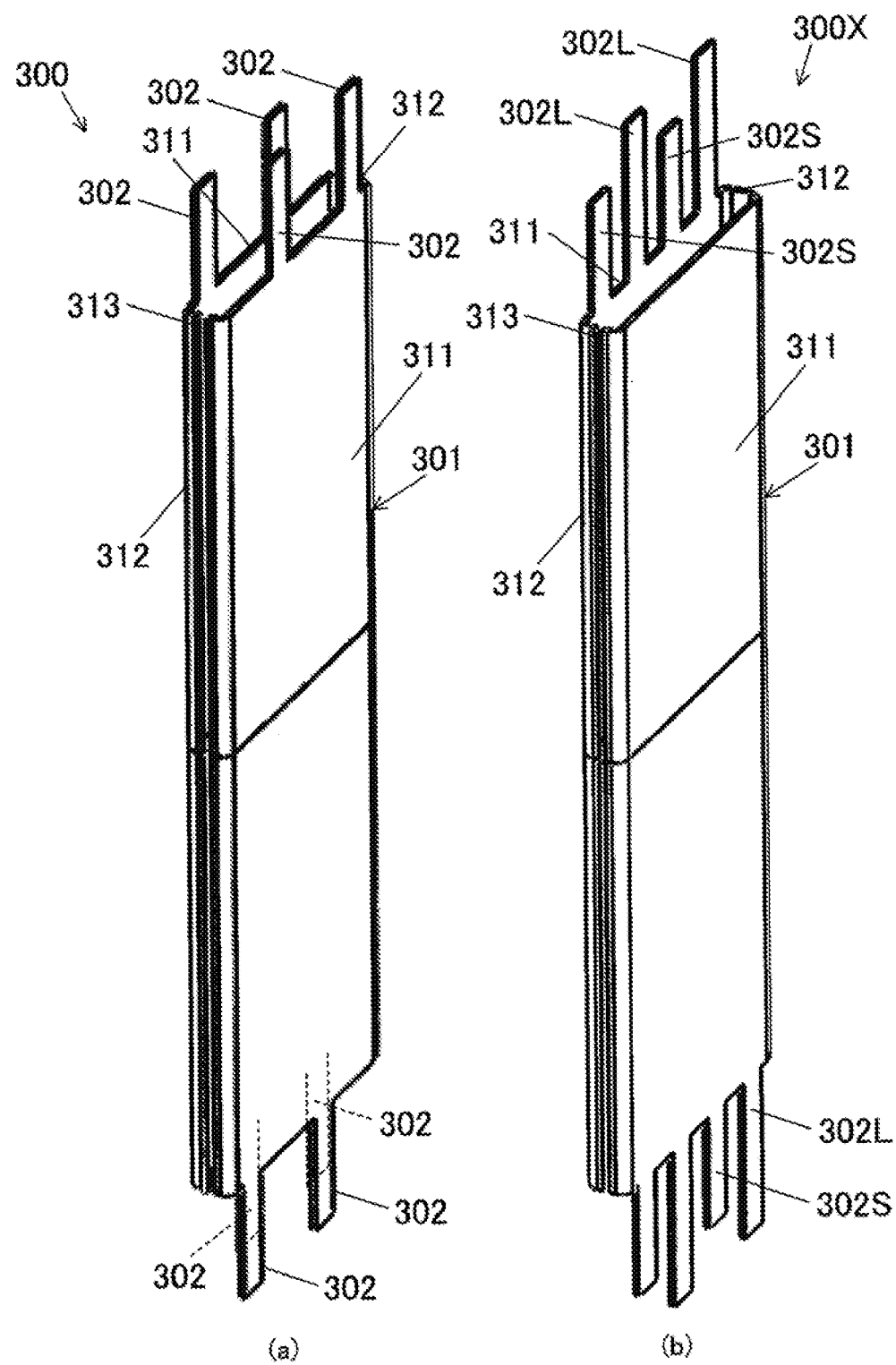

[FIG. 7]
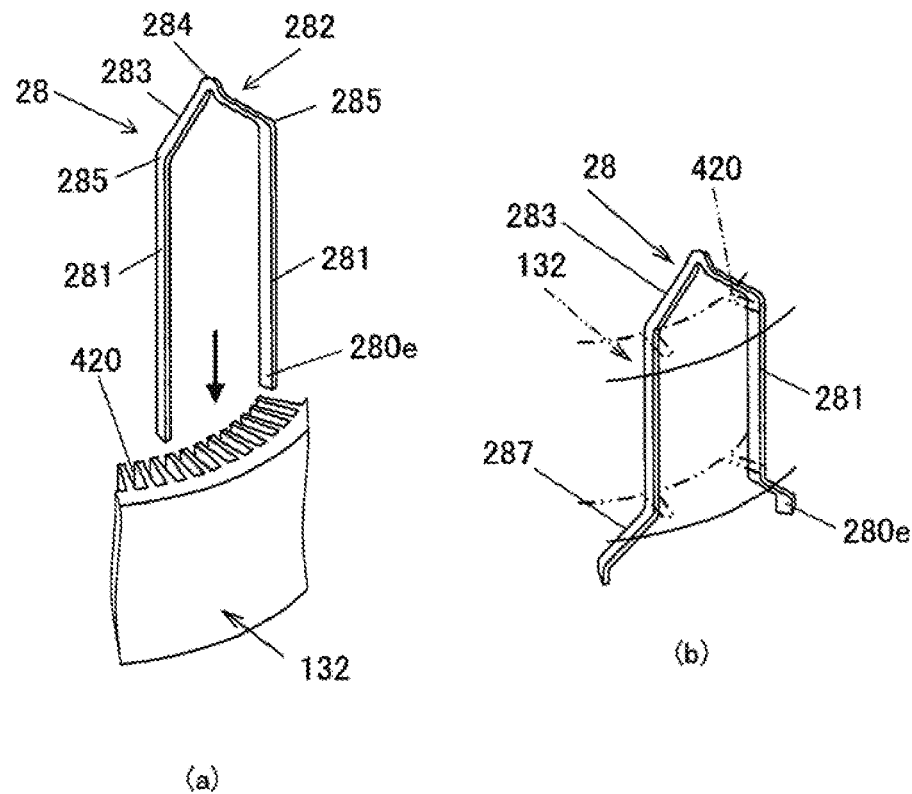
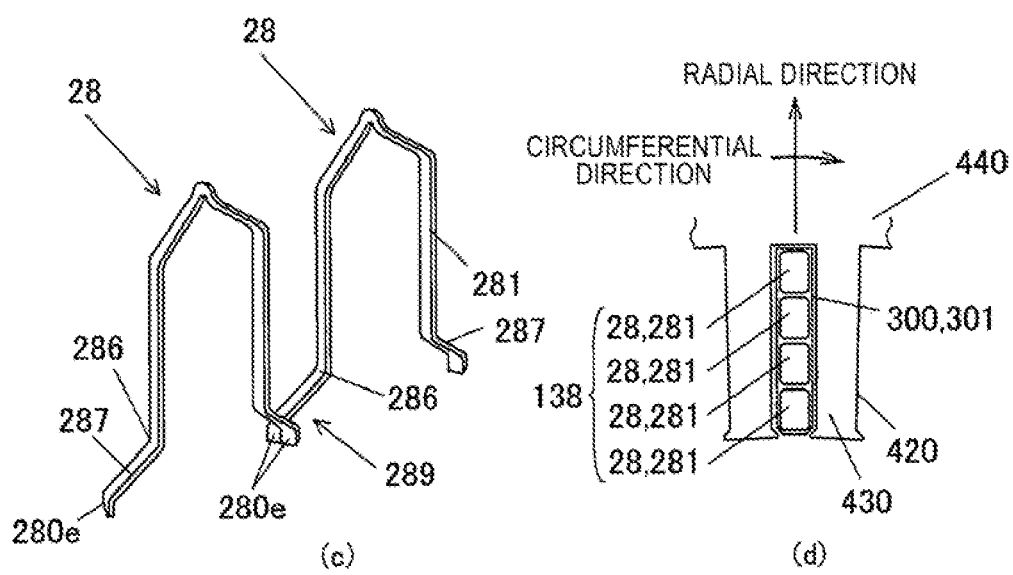

[FIG. 8]
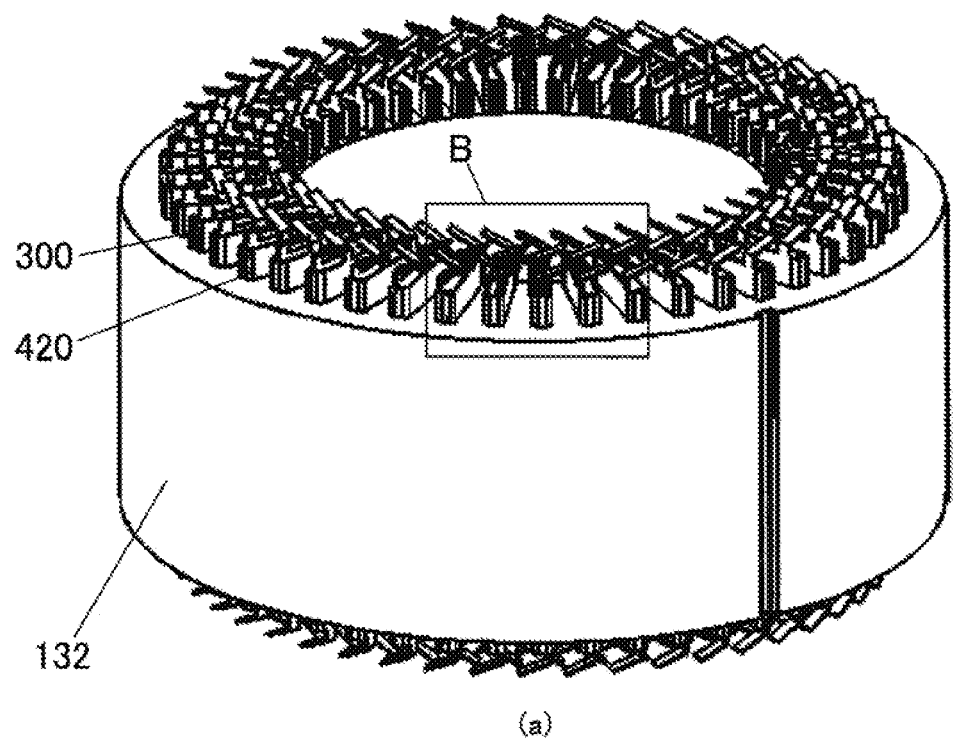
(a)
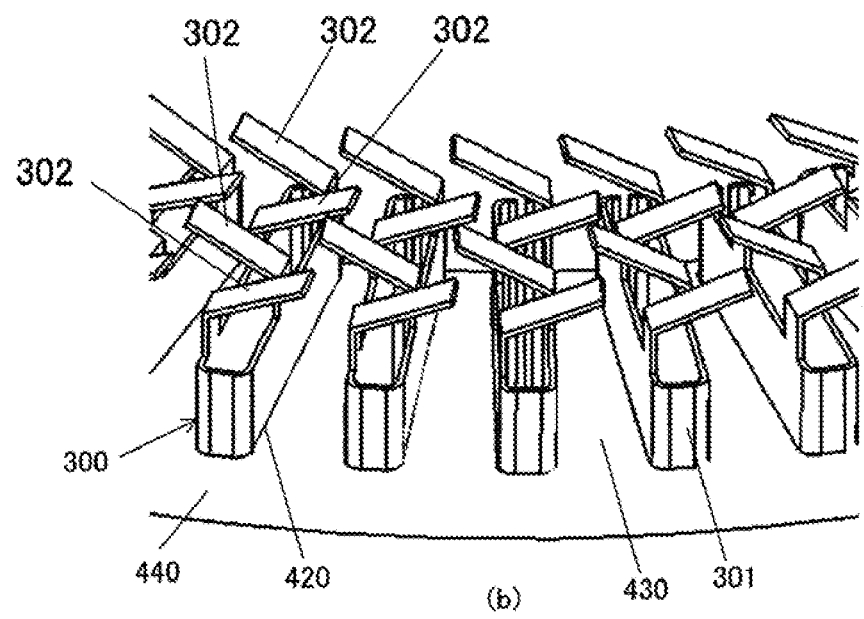
(b)

[FIG. 9]
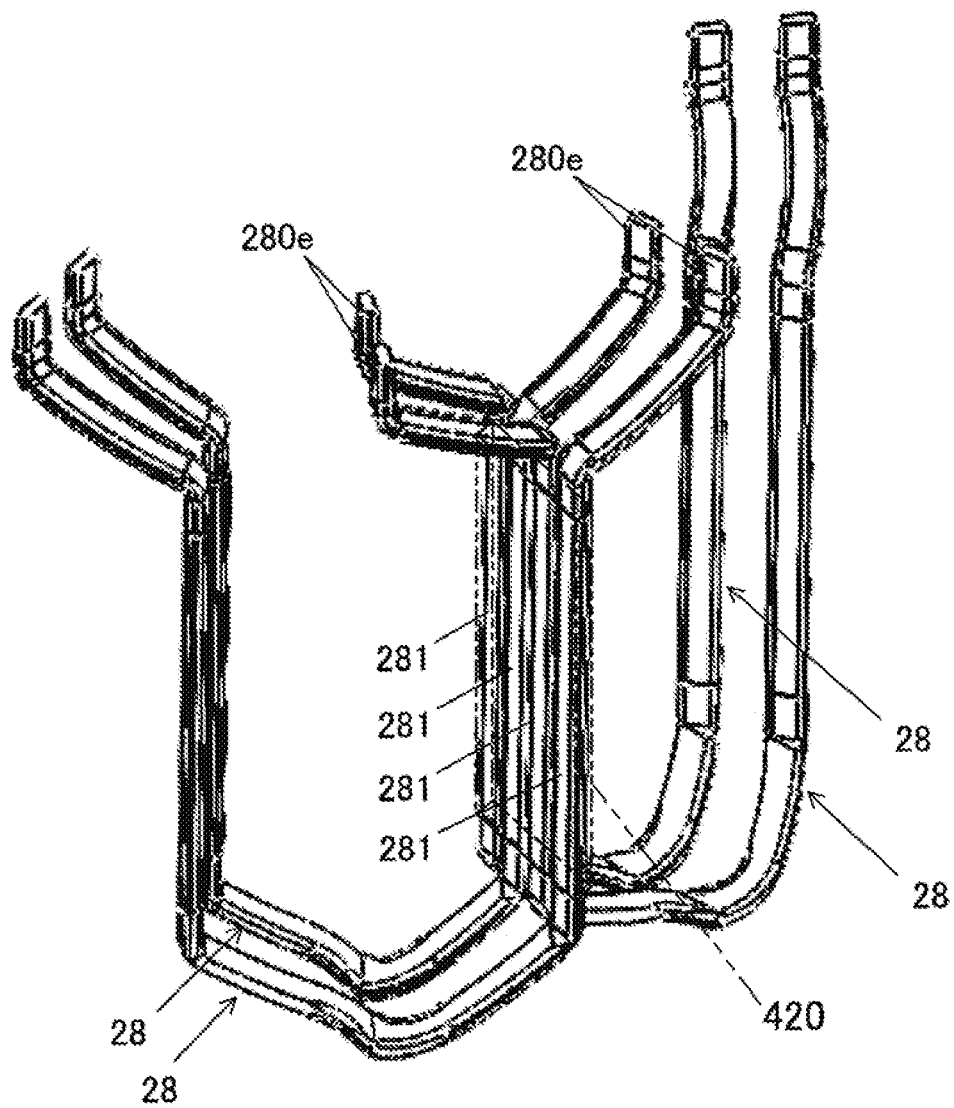

[FIG. 10]
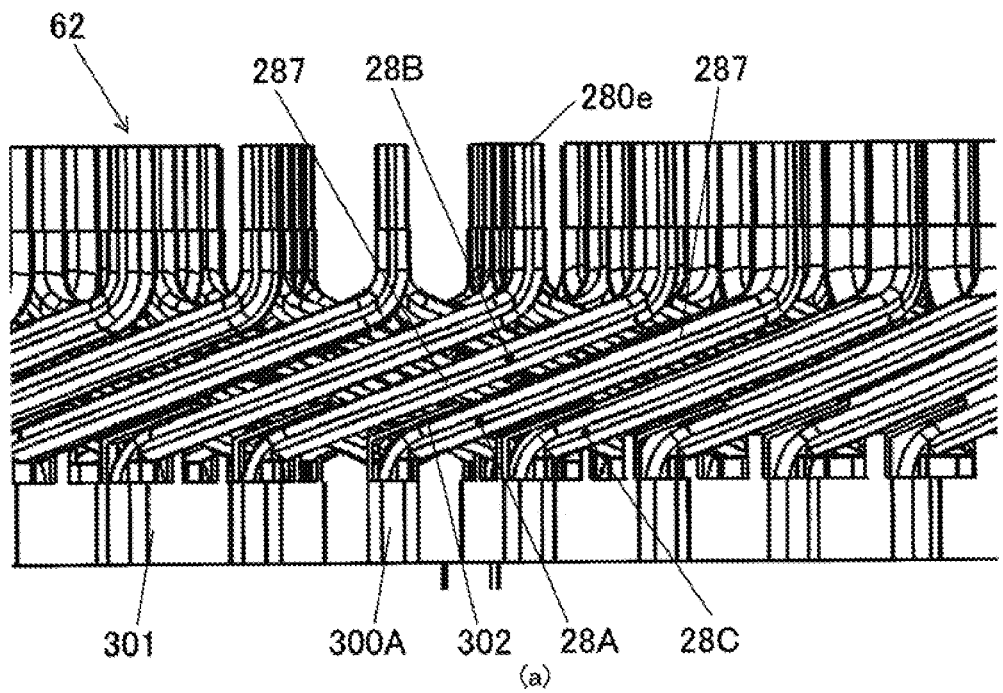
(a)
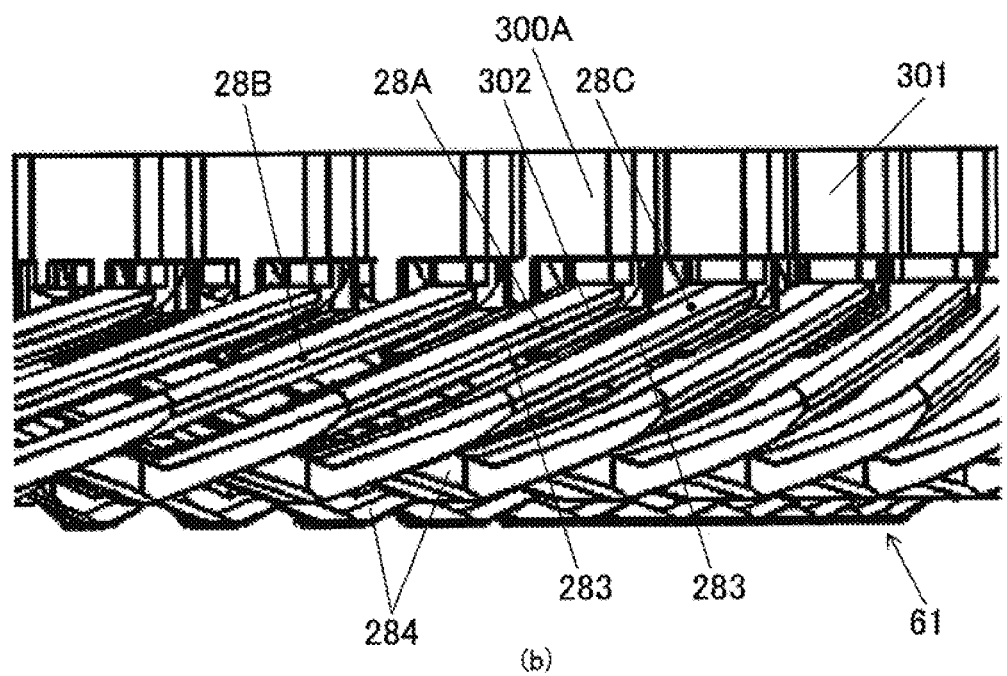
(b)

[FIG. 11]
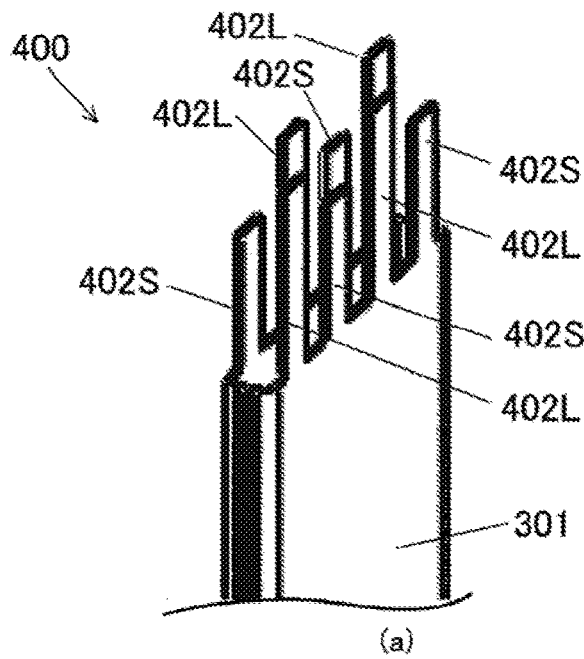
(a)
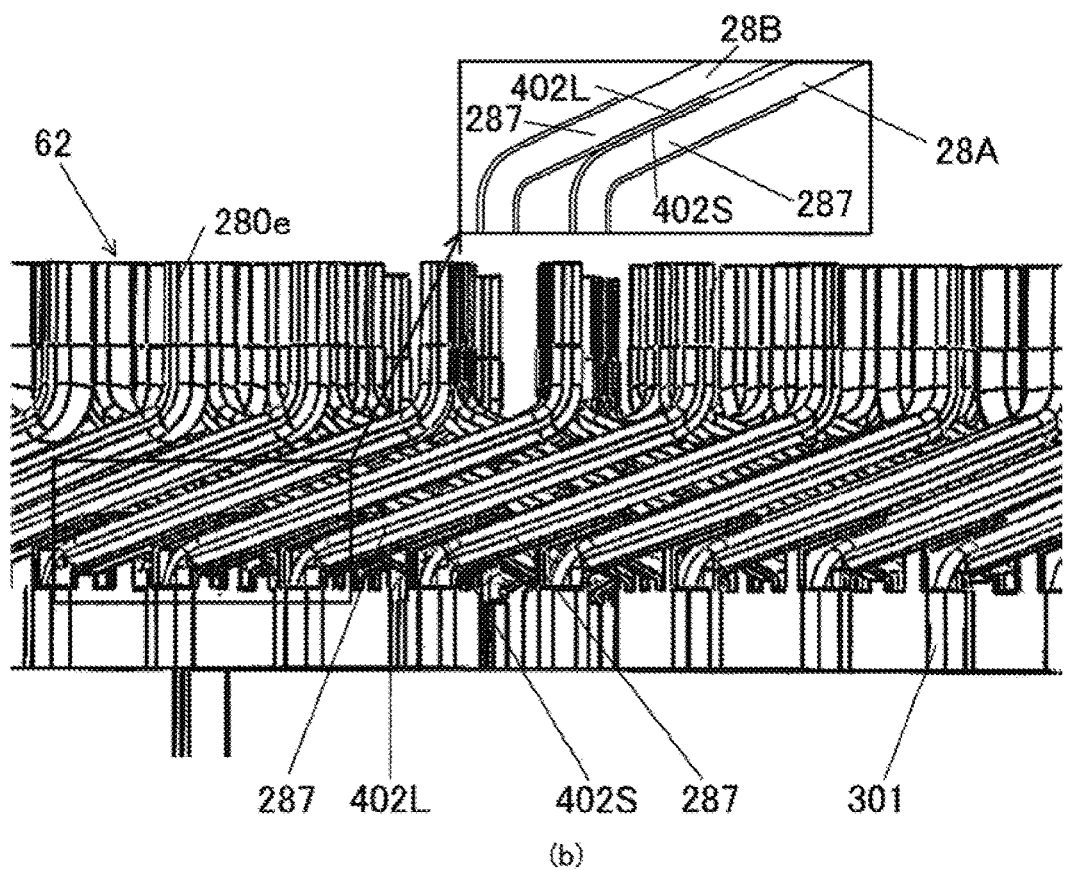
(b)

[FIG. 12]
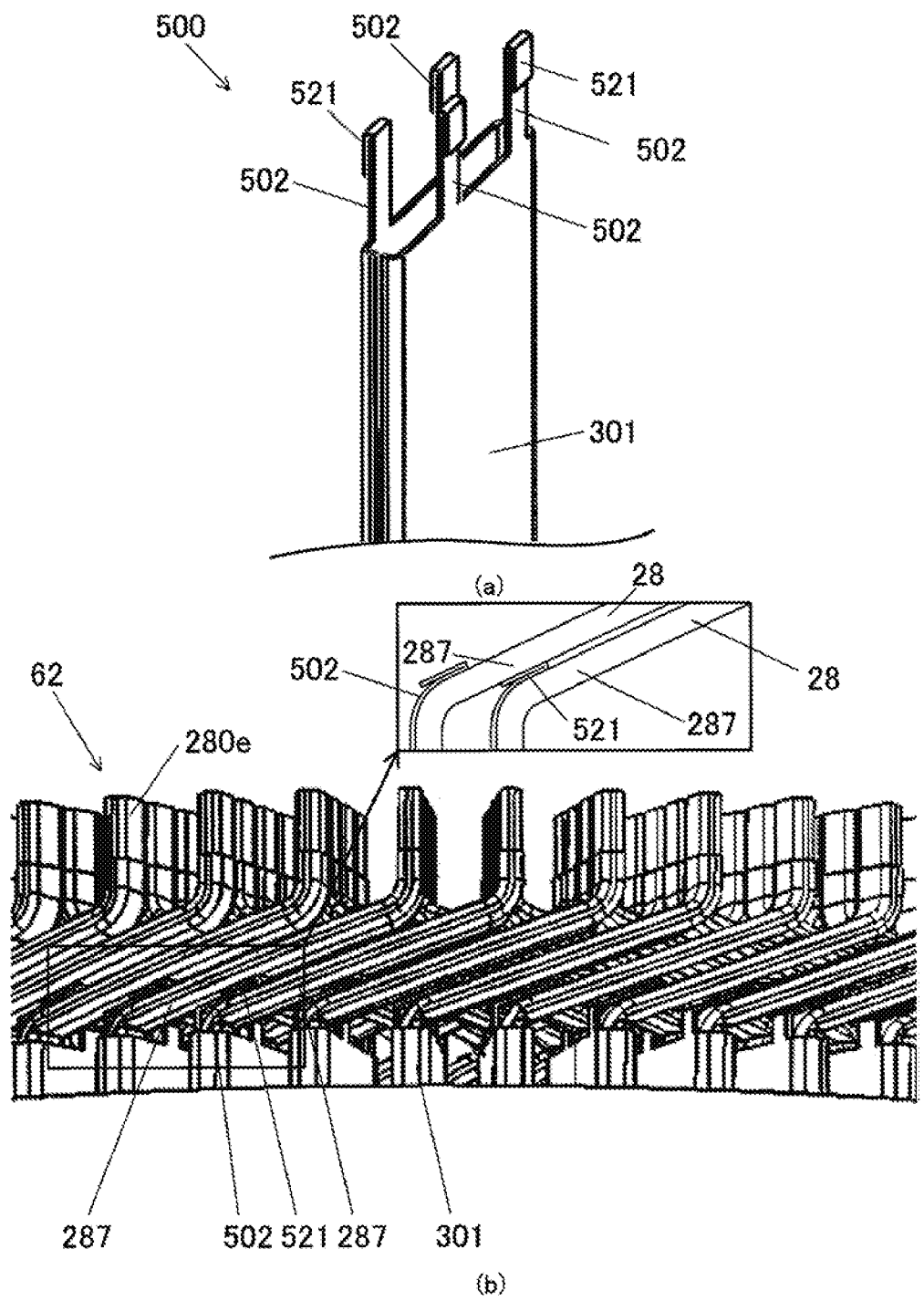

[FIG. 13]
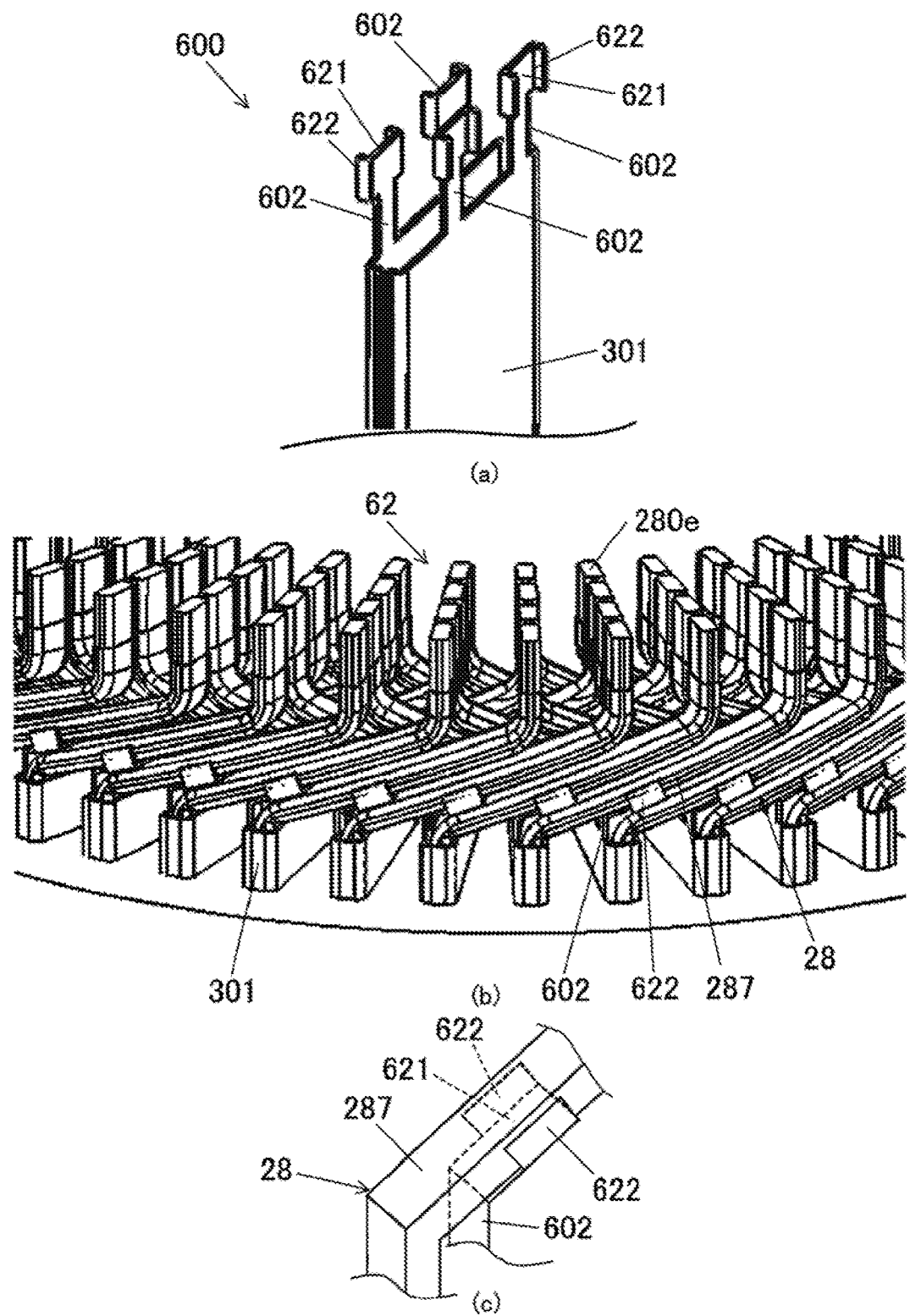

[FIG. 14]
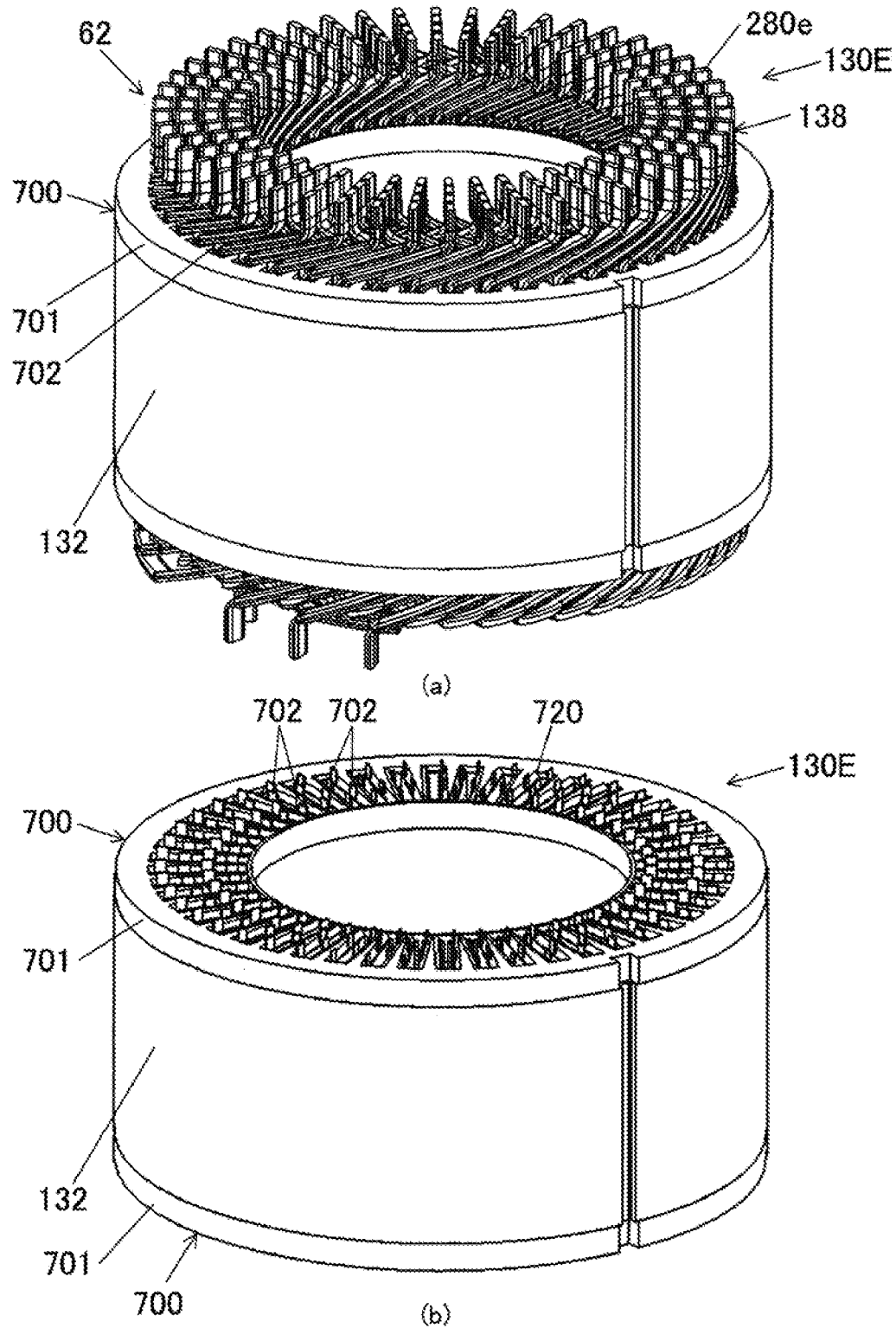

[FIG. 15]
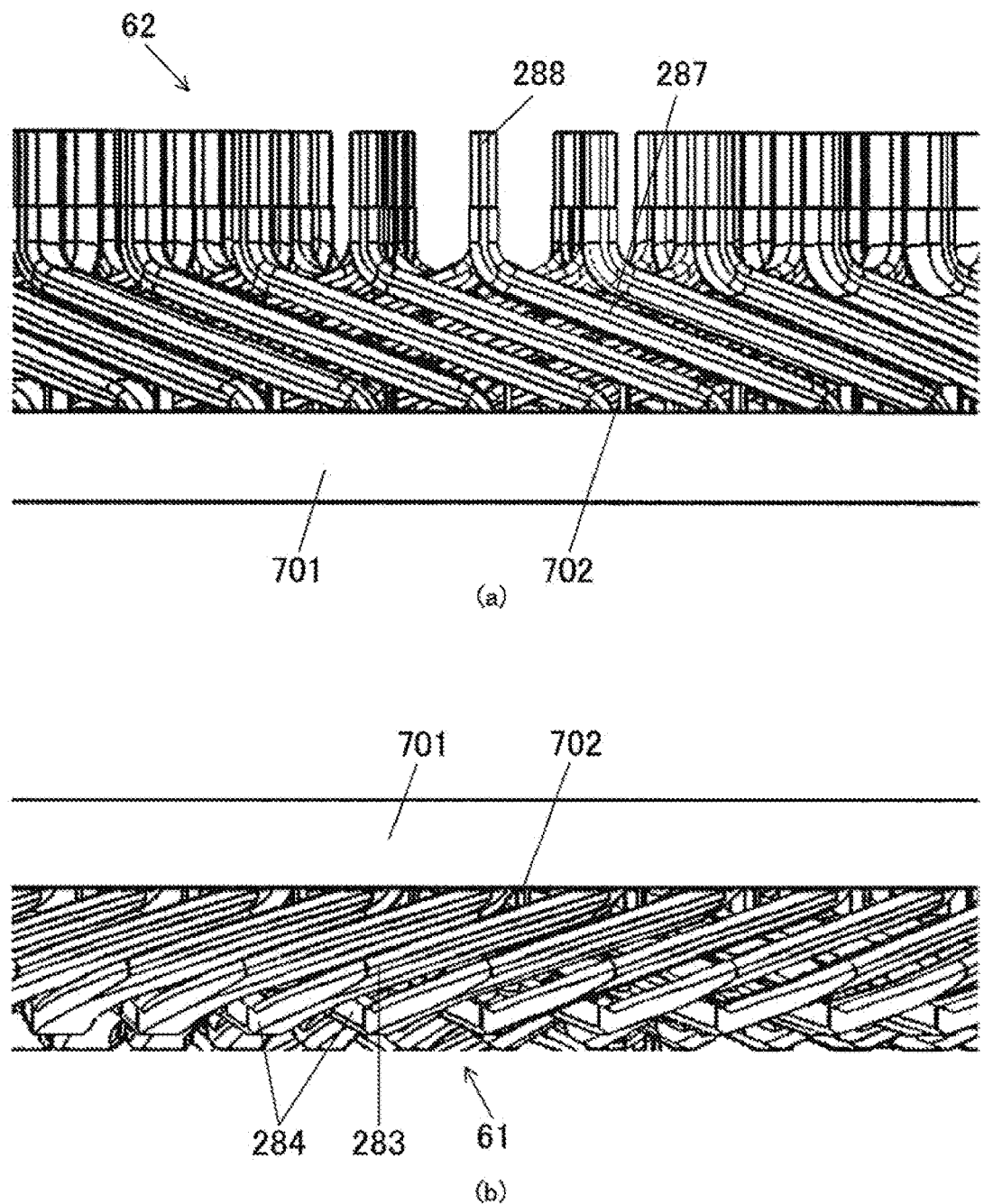

[FIG. 16]
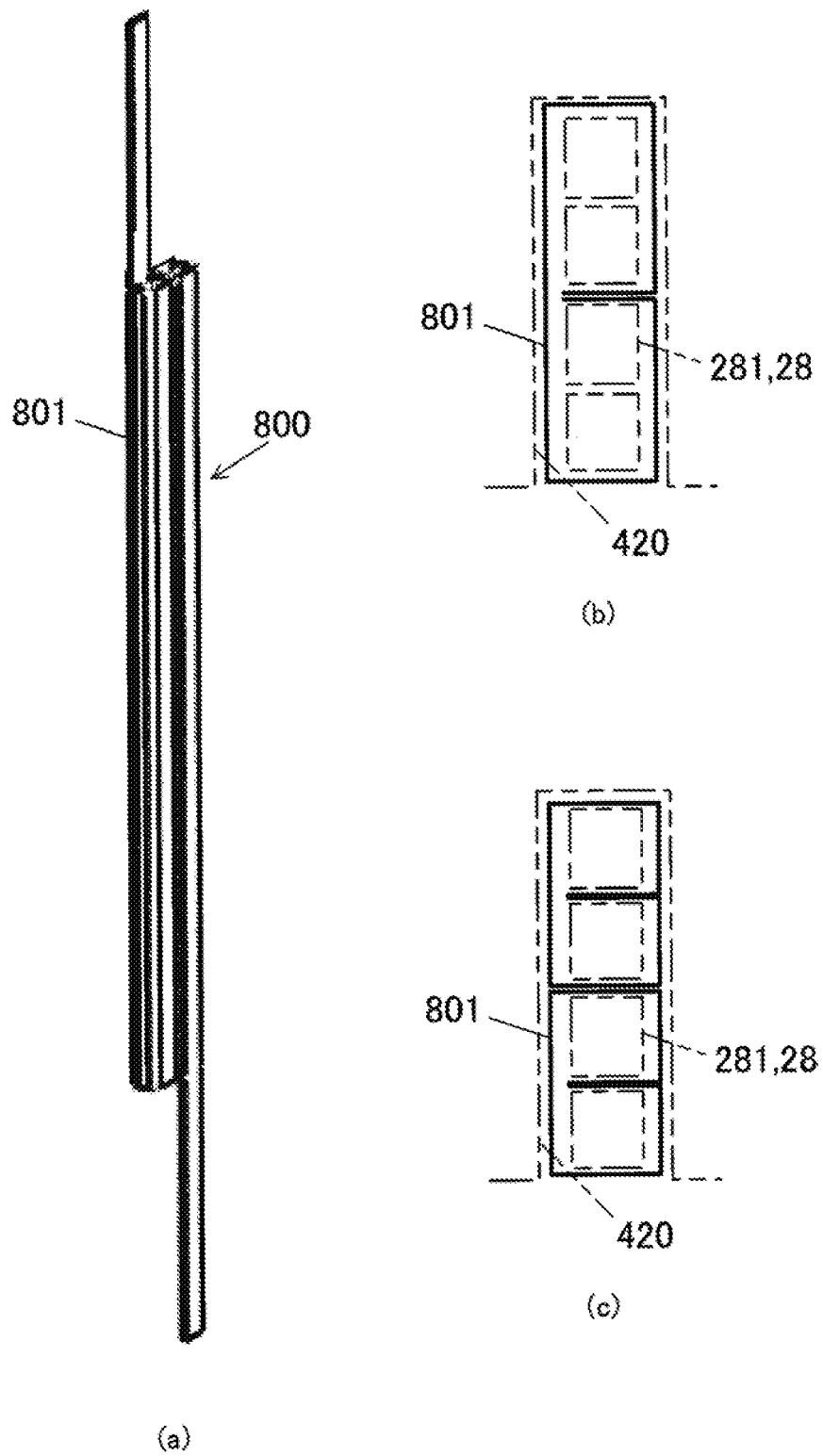

STATOR AND ROTARY ELECTRIC MACHINE

TECHNICAL FIELD

The present invention relates to a stator and a rotary electric machine.

BACKGROUND ART

A rotary electric machine is known in which a coil insulating member is mounted on interphase adjacent portions of a plurality of coils that are disposed adjacent to each other in a coil end exposed from a stator core of a stator coil (stator winding) (refer to PTL 1).

CITATION LIST

Patent Literature

PTL 1: JP-A-2011-72071

SUMMARY OF INVENTION

Technical Problem

In the coil insulating member described in PTL 1, a slit is provided along the coils. Therefore, the coil insulating member may be peeled off from the coils. As a result, a short circuit may occur between adjacent coils in the coil end.

Solution to Problem

According to an aspect of the present invention, there is provided a stator including: a stator core that includes a plurality of slots; a stator coil that is formed by connecting a plurality of segment conductors to each other; and an insulating member that has insulating properties, in which the segment conductor includes a slot portion and an inclined portion, the slot portion is disposed inside the slot, the inclined portion is disposed outside the slot to be inclined from the slot portion, the insulating member is mounted on the stator core and includes a first insulating portion and a plurality of second insulating portions, the first insulating portion is disposed next to the slot portion, the plurality of second insulating portions extend from the first insulating portion in an axial direction and are provided along a radial direction of the stator core, and the second insulating portions insulate adjacent segment conductors in an coil end from each other.

Advantageous Effects of Invention

According to the present invention, a short circuit between coils caused by peel-off of an insulating member can be prevented, the insulating member insulating adjacent coils in a coil end from each other.

BRIEF DESCRIPTION OF DRAWINGS

FIG. 1 is a schematic diagram illustrating an overall configuration of a rotary electric machine according to an embodiment.
FIG. 2 is a perspective view illustrating a stator.
FIG. 3 is a perspective view illustrating a stator core.
FIG. 4 is a block diagram illustrating an example of a rotary electric machine system including the rotary electric machine.
FIG. 5($a$) is a diagram illustrating a first winding unit, FIG. 5($b$) is a diagram illustrating a second winding unit, FIG. 5($c$) is a diagram illustrating a segment conductor, and FIG. 5($d$) is a diagram illustrating a half coil.
FIG. 6($a$) is a perspective view illustrating a slot liner according to a first embodiment, and FIG. 6($b$) is a perspective view illustrating a slot liner according to a modification example of the first embodiment.
FIGS. 7($a$) to 7($c$) are schematic diagrams for explaining a step of mounting segment conductors on the stator core, and FIG. 7($d$) is a cross-sectional plan view schematically illustrating a stator coil mounted on a slot.
FIG. 8($a$) is a diagram illustrating the rotary electric machine illustrated in FIG. 2 from which the stator coil is removed, and FIG. 8($b$) is an enlarged view illustrating a portion B of FIG. 8($a$).
FIG. 9 is a perspective view illustrating four segment conductors disposed in one slot.
FIG. 10($a$) is an enlarged view illustrating a bent coil end, and FIG. 10($b$) is an enlarged view illustrating a welded coil end.
FIG. 11 is a diagram illustrating a slot liner used in a rotary electric machine according to a second embodiment.
FIG. 12 is a diagram illustrating a slot liner used in a rotary electric machine according to a third embodiment.
FIG. 13 is a diagram illustrating a slot liner used in a rotary electric machine according to a fourth embodiment.
FIG. 14($a$) is a diagram illustrating a stator used in a rotary electric machine according to a fifth embodiment, and FIG. 14($b$) is a perspective view illustrating a stator core on which end plates are mounted.
FIGS. 15($a$) and 15($b$) are an enlarged view illustrating a welded coil end of the stator according to the fifth embodiment and an enlarged view illustrating a bent coil end of the stator, respectively.
FIG. 16($a$) is a perspective view illustrating a slot liner according to a modification example, FIG. 16($b$) is a cross-sectional plan view schematically illustrating a state where the slot liner according to the modification example is mounted on a slot, and FIG. 16($c$) is a cross-sectional plan view schematically illustrating a state where a slot liner according to another modification example is mounted on a slot.

DESCRIPTION OF EMBODIMENTS

First Embodiment

A rotary electric machine according to an embodiment is applicable to, for example, a generator motor for driving a main engine as a driving source of a vehicle, or an electric motor for driving auxiliary devices such as an electric power steering or an air compressor. Hereinafter, a rotary electric machine that is configured as an electric motor for driving an electric power steering as an auxiliary device will be described as an example.

FIG. 1 is a schematic diagram illustrating an overall configuration of a rotary electric machine 100 according to an embodiment. FIG. 1 illustrates a cross-section of one portion of the rotary electric machine 100 to illustrate the inside of the rotary electric machine 100. As illustrated in FIG. 1, the rotary electric machine 100 is disposed inside a case 10. The rotary electric machine 100 includes: a cylindrical housing 112; a stator 130 that is fixed to the housing 112 and includes a stator core 132; and a rotor 150 that is disposed on an inner circumferential side of the stator core 132 to be rotatable with a gap relative to the stator core 132. The rotor 150 includes: a rotor core 152; and a permanent magnet 154 that is held in a magnet slot formed in the rotor core 152.

The rotary electric machine 100 is, for example, a three-phase synchronous motor with a permanent magnet. The rotary electric machine 100 operates as an electric motor that rotates the rotor 150 by supplying a three-phase alternating current to a stator coil 138 wound around the stator core 132. That is, the rotary electric machine 100 generates a rotating torque based on electric energy.

A flange 115 provided in the housing 112 is fixed to the case 10 through a bolt 12 such that the stator 130 fixed to the housing 112 is fixed and held in the case 10. The rotor 150 is fixed to a shaft 118 that is supported by bearings 14A and 14B of the case 10, and is rotatably held inside the stator core 132. A driving force of the rotary electric machine 100 is transmitted to a driving mechanism of an electric power steering system (not illustrated) through a pulley (not illustrated) attached to the shaft 118.

FIG. 2 is a perspective view illustrating the stator 130, and FIG. 3 is a perspective view illustrating the stator core 132. FIG. 3 illustrates a state of the stator core 132 before mounting the stator coil 138 thereon. As illustrated in FIG. 2, the stator 130 includes: the cylindrical stator core 132; and the stator coil 138 that is mounted on the stator core 132. In the stator core 132, a plurality of slots 420 parallel to a central axial direction of the stator core 132 (hereinafter, simply referred to as "axial direction") are formed at regular intervals along a circumferential direction of the stator core 132.

In the slot 420, leg portions 281 (refer to FIG. 7) of a segment conductor 28 that constitutes apart of the stator coil 138 are accommodated. As illustrated in FIG. 7(d), an opening is formed on an inner circumferential side of each of the slots 420, and the width of the opening in the circumferential direction is substantially equal to or slightly smaller than a coil mounting portion of each of the slots 420 on which the stator coil 138 is mounted.

Teeth 430 are formed between the slots 420, and each of the teeth 430 is integrated with an annular core back 440. That is, the stator core 132 is an integrated core in which each of the teeth 430 and the core back 440 are integrally molded. The teeth 430 function to guide a rotating torque generated by the stator coil 138 to the rotor 150 to generate a rotating torque in the rotor 150.

The stator core 132 illustrated in FIG. 2 is obtained by molding an electromagnetic steel sheet having a thickness of about 0.05 to 1.0 m by punching or etching and stacking a plurality of molded annular electromagnetic steel sheets. The stator core 132 is fitted and fixed into the housing 112 (refer to FIG. 1) by shrinkage fitting.

FIG. 4 is a block diagram illustrating an example of a rotary electric machine system including the rotary electric machine 100. The rotary electric machine system includes the rotary electric machine 100 and a driving portion 200 that drives the rotary electric machine 100. The stator coil 138 of the rotary electric machine 100 includes two sets of three-phase windings. Hereinafter, one set of three-phase windings will be called a first winding unit 51, and the other set of three-phase windings set will be called a second winding unit 52. In addition, a circuit that is configured by the first winding unit 51 will be called a first circuit, and a circuit that is configured by the second winding unit 52 will be called a second circuit. The first winding unit 51 includes an U1 phase winding, a V1 phase winding, and an W1 phase winding. The second winding unit 52 includes an U2 phase winding, a V2 phase winding, and an W2 phase winding. Each of the U1 phase winding, the V1 phase winding, the W1 phase winding, the U2 phase winding, the V2 phase winding, and the W2 phase winding is a wave-winding coil that is obtained by connecting a plurality of segment conductors 28 (refer to FIG. 7) to each other.

In the rotary electric machine 100 a magnetic pole sensor 3 that detects a magnetic pole position of the rotor 150 and outputs a detection signal to a control unit 33 of the driving portion 200 is provided. A current is supplied from a first inverter 31 as a power conversion device to the first winding unit 51, and a current is supplied from a second inverter 32 as a power conversion device to the second winding unit 52. The first inverter 31 and the second inverter 32 supplies currents to the first winding unit 51 and the second winding unit 52 based on a driving instruction output from the control unit 33.

The control unit 33 calculates a target torque of the rotary electric machine 100 based on, for example, detection information input from the magnetic pole sensor 3 or a detection value of a torque sensor (not illustrated) attached to a steering shaft. The control unit 33 controls the first inverter 31 and the second inverter 32 such that a current value of the rotary electric machine 100 is a current value corresponding to the target torque.

The three-phase windings of the first winding unit 51 and the second winding unit 52 are connected in the form of Y-connection (star connection), and neutral points thereof are electrically connected to each other. The three-phase windings are driven in parallel by the first inverter 31 and the second inverter 32 that are electrically separated from the first winding unit 51 and the second winding unit 52 and are independent from each other.

In the embodiment, a pseudo-parallel circuit is configured by the two sets of winding units. Therefore, in a case where a defect occurs in any one of the first circuit and the second circuit, a system that controls the rotary electric machine 100 using the other normal circuit and ends the operation of the rotary electric machine 100 can be constructed.

As illustrated in FIG. 2, in the embodiment, the first winding unit 51 and the second winding unit 52 are mounted on the stator core 132 by distributed winding. Distributed winding is a winding method in which phase windings are wound around the stator core 132 such that the phase windings are accommodated in two slots 420 that are separated across a plurality of slots 420.

As illustrated in FIG. 7(d), as the stator coil 138, a flat wire is used such that a rectangular cross-section of the stator coil 138 in each of the slots 420 is short in the circumferential direction of the stator core 132 and is long in a radial direction of the stator core 132. An outer circumference of this flat wire is covered with an insulating film. In each of the slots 420, four segment conductors 28 are disposed along the radial direction of the stator core 132. By using the flat wire instead of a round wire, a space factor of the segment conductors 28 in the slot 420 can increase, and thus the output power of the rotary electric machine 100 can be improved.

FIG. 5(a) is a diagram illustrating the first winding unit 51, and FIG. 5(b) is a diagram illustrating the second winding unit 52. The first winding unit 51 and the second winding unit 52 are disposed to be mechanically displaced by 45 degrees. FIG. 5(c) is a diagram illustrating the segment conductor (hairpin coil) 28, and FIG. 5(d) is a diagram illustrating a half coil 28H. In the stator coil 138, as described above, the plurality of segment conductors 28 having a substantially U-shape and a plurality of half coils 28H are connected to each other. The six sets (U1, U2, V1, V2, W1, and W2) of coils are arranged at appropriate intervals by the slots 420. One end portion of the half coil 28H is configured as an input/output alternating current terminal 288.

As illustrated in FIG. 5(a), the six sets (U1, U2, V1, V2, W1, W2) of phase windings are sequentially disposed along the circumferential direction of the stator core 132 on a two-slot basis. That is, as illustrated in FIG. 5(a), the phase windings are disposed in order of U1, U1, V1, V1, W1, and W1 counterclockwise. Further, as illustrated in FIG. 5(b), the phase windings are disposed in order of U2, U2, V2, V2, W2, and W2 counterclockwise. In coil ends, portions where the first winding unit 51 and the second winding unit 52 overlap each other in the circumferential direction are disposed adjacent to each other. For example, an axially inner side surface (end surface on the stator core 132 side facing an end surface of the stator core 132) of a coil end in a region X indicated by broken line in FIG. 5(a) and an axially outer side surface of a coil end in a region Y indicated by broken line in FIG. 5(b) are disposed adjacent to each other.

However, even in a case where the segment conductors 28 and the half coils 28H are molded with high accuracy, due to deformation during assembly, a variation in an assembly position in the axial direction, or the like, coil ends of different phases may come into contact with each other such that insulating films are damaged and a short circuit occurs. Therefore, in the embodiment, a protrusion piece 302 having insulating properties is provided in all the adjacent portions including adjacent portions between the first winding unit 51 and the second winding unit 52 in coil ends, interphase adjacent portions of the first winding unit 51, and interphase adjacent portions of the second winding unit 52. As a result, a withstand voltage between coils is improved. The details of the protrusion piece 302 will be described below.

As illustrated in FIG. 5(c), the segment conductor 28 is formed in a substantially U-shape and includes: a pair of leg portions 281 that linearly extend; and a top portion 282 that connect the pair of leg portions 281 to each other. The top portion 282 includes: a pair of inclined portions 283; and a bent portion 284 that connect the pair of inclined portions 283 to each other. Bent portions 285 obtained by bending conductors are formed between opposite end portions of the top portion 282 and the pair of leg portions 281, respectively. That is, the top portion 282 and the leg portions 281 are connected to each other through the bent portions 285. The inclined portions 283 are inclined by a predetermined angle from the leg portions 281 parallel to the axial direction.

In a case where the segment conductors 28 are connected to each other to form each of the phase windings, as illustrated in FIG. 7(a), the pair of leg portions 281 of one segment conductor 28 are inserted into different slots 420 from one side in the axial direction of the stator core 132, respectively. Next, as illustrated in FIG. 7(b), the leg portions 281 that protrude to the other side the axial direction of the stator core 132 are bent in a direction of another segment conductor to be connected, and as illustrated in FIG. 7(c), welding end portions 280e of the leg portions 281 are welded to welding end portions 280e of the other segment conductor 28.

Portions that protrude from the other side in the axial direction of the stator core 132, that is, portions of the leg portions 281 excluding slot portion disposed inside the slot 420 will be called connection portions 289. In the connection portions 289, end portions of the pair of leg portions 281 are bent outward in the circumferential direction so as to be separated from each other to form bent portions 286, and inclined portions 287 extend from the bent portions 286. As in the case of the inclined portions 283, the inclined portions 287 are inclined by a predetermined angle from the leg portions 281 (portions disposed in the slot) parallel to the axial direction The pair of inclined portions 287 are bent such that end portions thereof are parallel to each other in the axial direction. As a result, the welding end portions 280e having tips to be welded are formed. The insulating films of the welding end portions 280e are removed before welding.

In a case where each of the segment conductors 28 is welded to the welding end portions 280e and is mounted on the stator core 132 as the stator coil 138, linear portions of the pair of leg portions 281 of each of the segment conductors 28 are disposed inside the slot 420.

As illustrated in FIG. 2, an assembly of the top portions 282 that protrude outward to the one side in the axial direction of the stator core 132 configures a coil end that is exposed from the stator core 132 (hereinafter, referred to as "bent coil end 61"). An assembly of the connection portions 289 that protrude outward to the other side in the axial direction of the stator core 132 configures a coil end that is exposed from the stator core 132 (hereinafter, referred to as "welded coil end 62"). As illustrated in the drawings, the coil ends are disposed to overlap each other in the circumferential direction of the stator core 132. Therefore, the length of the rotary electric machine 100 in the axial direction can be reduced.

As illustrated in FIG. 5(d), the half coil 28H includes: the single leg portion 281; the inclined portion 283 that extends through the bent portion 285 of one end of the leg portion 281; and the alternating current terminal 288 that is bent and extends from the end portion of the inclined portion 283 to be parallel to the leg portion 281. The leg portion 281 of the half coil 28H is inserted into the slot 420, and a portion of the leg portion 281 protruding from the slot 420 is bent and is welded to the segment conductor 28. The stator 130 is connected to the power conversion devices (the first inverter 31 and the second inverter 32) through the alternating current terminal 288 such that an alternating current power is supplied.

As illustrated in FIG. 7(d), the stator coil 138 is inserted into the slot 420 while being insulated by a slot liner 300. That is, the outer circumferences of the leg portions 281 of the segment conductors 28 of the stator coil 138 are covered with the slot liner 300 in the slot 420.

FIG. 6 (a) is a perspective view illustrating the slot liner 300 according to the first embodiment. The slot liner 300 is formed of, for example, insulating paper (insulating film) having heat resistance and insulating properties such as heat-resistant polyamide and has a thickness of about 0.1 to 0.5 mm. The slot liner 300 includes: a main body portion 301 that is disposed inside the slot 420; and a plurality of protrusion pieces 302 that are disposed outside the slot 420. The length of the main body portion 301 is slightly longer than the length of the slot 420, and end portions thereof are slightly exposed from the stator core 132 (refer to FIG. 2). The plurality of protrusion pieces 302 are formed by punching insulating paper. It can be said that the plurality of protrusion pieces 302 are divided pieces that are obtained by dividing the portion exposed outward from the slot 420. The respective protrusion pieces 302 can be individually bent to one side and the other side in the circumferential direction, and thus can be alternately inclined in different directions as described below (refer to FIG. 8).

The main body portion 301 has a substantially rectangular cylindrical shape by bending insulating paper having a substantially rectangular shape. The main body portion 301 includes: a pair of long side portions 311 that form long sides of a rectangle in a plane section; and a pair of short side portions 312 that form short sides of the rectangle in the plane section. On one of the pair of short side portions 312, opposite end portions of the insulating paper having a substantially rectangular shape are positioned. In the opposite end portions of the insulating paper, as illustrated in FIG. 6(a), after molding, a cut portion (slit) 313 that extends in the axial direction is formed in the short side portion 312.

As illustrated in FIG. 7(d), the main body portion 301 is disposed between sides of the leg portions 281, that is, side surfaces of the segment conductors 28 and an inner surface of the slot 420 so as to insulate the segment conductors 28 and the slot 420 from each other.

As illustrated in FIG. 6(a), the respective protrusion pieces 302 extend from end portions of the long side portions 311 in a longitudinal direction. In a state where the slot liner 300 is mounted on the slot 420, protrusion pieces 302 on one of the pair of long side portions 311 and protrusion pieces 302 on the other one of the pair of long side portions 311 are not disposed in positions facing the circumferential direction (refer to FIG. 8). In each of opposite ends of the main body portion 301, four protrusion pieces 302 provided along the radial direction of the stator core 132 are alternately provided in one and the other among the pair of long side portions 311. It is preferable that the width (length in the radial direction) of the protrusion piece 302 is equal to or larger than the width (length in the radial direction) of the segment conductor 28. In an coil end 140, the protrusion piece 302 insulates adjacent segment conductors 28 in the circumferential direction from each other.

A method of manufacturing the stator 130 according to the embodiment will be described. A method of manufacturing the stator according to the embodiment includes a preparation step, a conductor insertion step that is a coil mounting step, and a welding step.

—Preparation Step—

In the preparation step, the stator core 132 (refer to FIG. 3), the segment conductor 28, and the half coil 28H (refer to FIGS. 5(c) and 5(d)) are prepared. As illustrated in FIG. 3, the slot liner 300 is mounted on each of the slots 420 of the stator core 132. In a case where the slot liner 300 is mounted on each of the slots 420, opposite end portions of the slot liner 300 protrude from opposite end portions of the stator core 132. The protrusion pieces 302 are provided outside the slot 420 and are bendable in the circumferential direction. As illustrated in FIGS. 5(c) and 5(d), the segment conductor 28 and the half coil 28H are bent in advance, and the insulating films of the welding end portions 280e are removed using a grinder, a mold, or the like.

—Conductor Insertion Step—

FIGS. 7(a) to 7(c) are schematic diagrams for explaining a step of mounting the segment conductors 28 on the stator core 132, and FIG. 7(d) is a cross-sectional plan view schematically illustrating the stator coil 138 mounted on the slot 420. In the conductor insertion step, as illustrated in FIG. 7(a), the segment conductor 28 is inserted from one end surface (an upper end surface in the drawing) of the stator core 132 into the slot 420 such that the welding end portions 280e of the segment conductor 28 protrude from the other end surface (a lower end surface in the drawing) of the stator core 132.

After inserting the segment conductor 28 into the slot 420, as illustrated in FIG. 7(b), the respective leg portions 281 taken out from the slot 420 are bent in the direction of the segment conductor 28 to be connected while maintaining the arrangement of four rows. Further, end portions are bent downward in the drawing and are aligned such that the welding end portions 280e of the segment conductors 28 are welded to each other as illustrated in FIG. 7(c). As illustrated in FIG. 7(d), the four conductors (leg portions 281) are disposed along the radial direction in each of the slots 420, and the main body portion 301 of the slot liner 300 is disposed between the conductors and the inner surface of the slot 420.

FIG. 8(a) is a diagram illustrating the rotary electric machine 100 illustrated in FIG. 2 from which the stator coil 138 is removed, and FIG. 8(b) is an enlarged view illustrating a portion B of FIG. 8(a). FIG. 9 is a perspective view illustrating four segment conductors 28 disposed in one slot 420. FIG. 10(a) is an enlarged view illustrating the bent coil end 61, and FIG. 10(b) is an enlarged view illustrating the welded coil end 62.

In a case where the segment conductors 28 are inserted, as illustrated in FIG. 10(b), the inclined portions 283 and the protrusion pieces 302 come into contact with each other such that the protrusion pieces 302 are bent by the inclined portions 283. In addition, in a case where the linear leg portions 281 protruding from the other end surface of the stator core 132 are bent, as illustrated in FIGS. 8(a), 8(b), and 10(a), the inclined portions 283 and the protrusion pieces 302 come into contact with each other such that the protrusion pieces 302 are bent by the inclined portions 283.

As illustrated in FIG. 9, four leg portions 281 disposed in one slot 420 in the radial direction are disposed such that bending directions thereof alternately change in the radial direction in one end surface side and the other end surface side of the stator core 132. Therefore, as illustrated in FIG. 8, regarding directions of the protrusion pieces 302 that are bent by the inclined portions 283 and 287 of the segment conductors 28, bending directions thereof alternately change in the radial direction. That is, a plurality of protrusion pieces 302 disposed along the radial direction in one slot 420 are alternately inclined toward one direction and the other side in the circumferential direction.

For convenience of description, a disposition relationship between the protrusion pieces 302 and the inclined portions 287 of the segment conductors 28 will be described using the slot liner 300 and the segment conductor 28 disposed in one slot 420 as a representative example. As illustrated in FIG. 10, the slot liner 300 and the segment conductor 28 disposed in one slot 420 will be called a first slot liner 300A and a first segment conductor 28A. The segment conductor 28 disposed another slot 420 adjacent to one side in the circumferential direction of the one slot 420 will be called a second segment conductor 28B. In addition, the segment conductor 28 disposed still another slot 420 adjacent to the other side in the circumferential direction of the one slot 420 will be called a third segment conductor 28C.

As illustrated in FIG. 10(a), in the welded coil end 62, the protrusion piece 302 of the first slot liner 300 is disposed between an axially outer side surface of the inclined portion 287 of the first segment conductor 28A and an axially inner side surface of the inclined portion 287 of the second segment conductor 28B. Likewise, as illustrated in FIG. 10(b), in the bent coil end 61, the protrusion piece 302 of the first slot liner 300 is disposed between an axially outer side surface of the inclined portion 283 of the first segment conductor 28A and an axially inner side surface of the inclined portion 283 of the third segment conductor 28C. In this specification, the axially inner side surfaces of the inclined portions 283 and 287 refer to side surfaces on the stator core 132 side facing an end surfaces of the stator core 132. As a result, a withstand voltage between the inclined portions of the segment conductors 28 that protrude from opposite end portions of the stator core 132 and are exposed from the stator core 132 are improved.

—Welding Step—

In the welding step, the welding end portions 280e of the segment conductors 28 are welded to each other using, for example, a TIG welding method or a plasma welding method. In the welding end portions 280e, a welded portion (joined portion) that is a portion where the welding end portions 280e are joined by welding is formed. By joining a plurality of segment conductors 28 to each other, the stator coil 138 is mounted on the stator core 132 such that the stator 130 is prepared.

In a case where the stator coil 138 is mounted on the stator core 132, the stator coil 138 prevents the slot liner 300 from coming off from the slot 420. This way, by providing the protrusion piece 302 integrally with the slot liner 300 mounted on the stator core 132, a short circuit between coils caused by peel-off of an insulating portion (protrusion piece 302) can be prevented, the insulating portion insulating adjacent coils in a coil end from each other.

According to the above-described embodiment, the following effects can be obtained.

(1) The rotary electric machine 100 according to the embodiment includes the stator 130 and the rotor 150, in which the stator 130 includes the stator core 132 that includes a plurality of slots 420, the stator coil that 138 is formed by connecting a plurality of segment conductors 28 to each other, and the slot liner 300 that has insulating properties, and the rotor 150 is disposed to be rotatable with a gap relative to the stator core 132. The segment conductor 28 includes the leg portion 281 (slot portion) and the inclined portions 283 and 287, the leg portion 281 (slot portion) is disposed inside the slot 420, and the inclined portions 283 and 287 are disposed outside the slot 420 to be inclined from the leg portion 281 (slot portion). The slot liner 300 is mounted on the stator core 132 and includes the main body portion 301 and a plurality of protrusion piece 302, the main body portion 301 is disposed next to the leg portion 281 (slot portion), the protrusion piece 302 extend from the main body portion 301 in the axial direction of the stator core 132 and are provided along the radial direction of the stator core 132, and the protrusion pieces 302 insulate adjacent segment conductors 28 in an coil end from each other.

The protrusion pieces 302 extend from the main body portion 301 mounted on the slot 420 and are integrated with the main body portion 301. As a result, a short circuit between coils caused by peel-off of the protrusion piece 302 (insulating portion) can be prevented, the protrusion piece 302 (insulating portion) insulating adjacent coils (segment conductors) in a coil end from each other.

(2) The protrusion piece 302 is disposed between the inclined portions 283 and the 287 of one segment conductor 28 and the inclined portions 283 and 287 of another segment conductor 28 adjacent to the one segment conductor 28. The protrusion piece 302 having a function as a spacer is interposed between the adjacent inclined portions 283 and 287. Therefore, a short circuit, which is caused when the adjacent inclined portions 283 and 287 come into contact with each other and the insulating films are peeled off, can be prevented.

(3) The plurality of protrusion pieces 302 that are provided along the radial direction are alternately inclined to one side and another side in the circumferential direction. The protrusion pieces 302 can be disposed along the inclined portions 283 and 287 of the segment conductor 28. Therefore, by adjusting the length of the protrusion pieces 302, a region covering the inclined portions 283 and 287 can be arbitrarily set.

(4) The protrusion piece 302 is provided so as to be disposed inside the slot 420, to be integrated with the main body portion 301 of the slot liner 300 that insulates the slot 420 and the segment conductor 28 from each other, and to insulate adjacent segment conductors 28 in a coil end outside the slot 420 from each other. As a result, separately from the slot liner 300, it is not necessary to another insulating member having a peel-off preventing function that is mounted on the stator core 132 and insulates adjacent coils in a coil end. That is the number of components can be reduced as compared to a case where another insulating member other than the slot liner 300 is provided.

(5) In a case where the segment conductors 28 are inserted into the slot 420, the protrusion pieces 302 protruding from the slot 420 in the axial direction are bent by the inclined portions 283 constituting the bent coil end 61 such that the protrusion pieces 302 can be easily disposed between the inclined portions 283.

(6) In a case where the conductors (leg portions 281) are bent after inserting the segment conductors 28 into the slot 420, the protrusion pieces 302 protruding from the slot 420 in the axial direction are bent by the inclined portions 287 constituting the welded coil end 62 such that the protrusion pieces 302 can be easily disposed between the inclined portions 287. That is, according to the embodiment, the insulating paper can be disposed between coils of a coil end without deterioration of assembly performance of the stator coil 138 to the stator core 132.

Modification Example of First Embodiment

In the description of the example in the embodiment, in each of opposite ends of the slot liner 300, two protrusion pieces 302 protrude from the pair of long side portions 311 (refer to FIG. 6(a)). However the present invention is not limited to the embodiment. As illustrated in FIG. 6(b), protrusion pieces may be provided in only one of the pair of long side portions 311 in one end of a slot liner 300X, and protrusion pieces may be provided in only the other one of the pair of long side portions 311 in the other one end of the slot liner 300. In this modification example, two kinds of protrusion pieces, that is, first protrusion pieces 302L having a long protrusion length from the long side portion 311 and second protrusion pieces 302S having a shorter protrusion length than the first protrusion pieces 302L are provided.

The first protrusion pieces 302L are bent by the inclined portions 283 and 287 that extend from the leg portions 281 inserted into the slot 420 in which the slot liner 300 is disposed, and are disposed between the axially inner side surfaces of the inclined portions 283 and 287 and the axially outer side surfaces of the adjacent inclined portions 283 and 287 adjacent thereto.

On the other hand, as in the case of the embodiment, the second protrusion pieces 302S are bent by the inclined portions 283 and 287 that extend from the leg portions 281 inserted into another slot 420 adjacent to the slot 420 in which the slot liner 300 is disposed. The second protrusion pieces 302S are disposed between the axially outer side surfaces of the inclined portions 283 and 287 that extend from the leg portions 281 inserted into the slot 420 in which the slot liner 300 is disposed, and the axially inner side surfaces of the adjacent inclined portions 283 and 287 adjacent thereto.

By setting the protrusion length of the first protrusion pieces 302L to be long, a predetermined length for covering outer side surfaces of the inclined portions 283 and 287 that extend from the leg portions 281 inserted into the other slot 420 adjacent to the slot 420 in which the slot liner 300 is disposed can be secured. According to this modification example, the same effects as those of the embodiment can be exhibited. As compared to the modification example, in the embodiment, all the protrusion pieces 302 of the slot liner 300 disposed on slot 420 are disposed so as to cover the outer side surfaces of the inclined portions 283 and 287 of the segment conductor 28 disposed in the same slot 420. As a result, the protrusion length of the protrusion pieces 302 can be reduced. In the embodiment, the length of all the protrusion pieces 302 can be made to be the same, and thus punching workability of insulating paper is excellent.

Second Embodiment

A rotary electric machine according to a second embodiment will be described with reference to FIG. 11. FIG. 11 is a diagram illustrating a slot liner 400 used in the rotary electric machine according to the second embodiment. FIG. 11(a) is an enlarged perspective view illustrating one end portion of the slot liner 400, and FIG. 11(b) is an enlarged view illustrating the welded coil end 62 corresponding to FIG. 10(a). In the drawings, components identical or equivalent to those of the first embodiment are represented by the same reference numerals, and the description thereof will not be repeated. Hereinafter, different points from the first embodiment will be described in detail. The welded coil end 62 side has substantially the same configuration as the bent coil end 61 side. Therefore, the configuration of the welded coil end 62 side will be described as a representative example, and the description of the bent coil end 61 side will not be made.

In the first embodiment, one protrusion piece 302 is disposed between the inclined portions 287 of adjacent segment conductors 28. On the other hand, in the second embodiment, two protrusion pieces (a first protrusion piece 402L and a second protrusion piece 402S) are disposed between the inclined portions 287 of adjacent segment conductors 28.

As illustrated in FIG. 11(a), in the slot liner 400 according to the second embodiment, the first protrusion piece 402L having a long protrusion length and the second protrusion piece 402S having a short protrusion length are provided to face each other in the circumferential direction such that the respective segment conductors 28 are interposed therebetween from opposite sides in the circumferential direction.

FIG. 11(b) is also a schematic diagram (refer to a rectangular frame) illustrating two adjacent segment conductors 28 in the circumferential direction and the two protrusion pieces (the first protrusion piece 402L and the second protrusion piece 402S) disposed between the two adjacent segment conductors 28. As illustrated in FIG. 11(b), the two protrusion pieces 402L and 402S are disposed between the adjacent segment conductors 28 in a state where they overlap each other.

In the second embodiment, the second protrusion piece 402S of the slot liner 400 disposed in one slot 420 and the first protrusion piece 402L of the slot liner 400 disposed in another slot 420 adjacent to the one slot 420 are disposed between the inclined portion 287 of the first segment conductor 28A disposed in the one slot 420 and the inclined portion 287 of the second segment conductor 28B disposed in the other slot 420 in a state where they overlap each other.

The first protrusion piece 402L protruding from the other slot 420 is inclined from the other slot 420 to the one slot 420. Therefore, it is necessary that the protrusion length of the first protrusion piece 402L is long as illustrated in the drawing in order to cover a base portion of the inclined portion 287 of the first segment conductor 28A of the one slot 420. In the embodiment, the first protrusion piece 402L is formed to be longer than the second protrusion piece 402S. Therefore, the first protrusion piece 402L protruding from the other slot 420 can cover a required region of the base portion of the inclined portion 287 of the segment conductor 28 protruding from the one slot 420 adjacent to the other slot 420.

According to the second embodiment, in addition to the same effects as those of the first embodiment, the thickness as a spacer between adjacent segment conductors 28 can be increased, and the adjacent segment conductors 28 can be more reliably insulated from each other.

Third Embodiment

A rotary electric machine according to a third embodiment will be described with reference to FIG. 12. FIG. 12 is a diagram illustrating a slot liner 500 used in the rotary electric machine according to the third embodiment. FIG. 12(a) is an enlarged perspective view illustrating one end portion of the slot liner 500, and FIG. 12(b) is an enlarged view illustrating the welded coil end 62 corresponding to FIG. 10(a). In the drawings, components identical or equivalent to those of the first embodiment are represented by the same reference numerals, and the description thereof will not be repeated. Hereinafter, different points from the first embodiment will be described in detail. The welded coil end 62 side has substantially the same configuration as the bent coil end 61 side. Therefore, the configuration of the welded coil end 62 side will be described as a representative example, and the description of the bent coil end 61 side will not be made.

In the third embodiment, a folded portion 521 that is formed by folding a tip portion of the protrusion piece 502 is provided. The folded portion 521 is configured as a multi-layer portion (overlapping portion) that is formed by stacking two insulating papers. According to the third embodiment, in addition to the same effects as those of the first embodiment, the thickness as a spacer between adjacent segment conductors 28 can be increased, and the adjacent segment conductors 28 can be more reliably insulated from each other.

Modification Example of Third Embodiment

In the description of the example of the third embodiment, the folded portion 521 having a multi-layer structure formed by stacking two insulating papers is formed. However, the present invention is not limited to this embodiment. For example, the folded portion 521 having a multi-layer structure formed by stacking three or more insulating papers may be formed.

Fourth Embodiment

A rotary electric machine according to a fourth embodiment will be described with reference to FIG. 13. FIG. 13 is a diagram illustrating a slot liner 600 used in the rotary electric machine according to the fourth embodiment. FIG. 13(a) is an enlarged perspective view illustrating one end portion of the slot liner 600, and FIG. 13(b) is an enlarged view illustrating the welded coil end 62 corresponding to FIG. 10(a). FIG. 13(c) is a schematic perspective view illustrating the inclined portion 287 and a protrusion piece 602 of one segment conductor 28. In the drawings, components identical or equivalent to those of the first embodiment are represented by the same reference numerals, and the description thereof will not be repeated. Hereinafter, different points from the first embodiment will be described in detail.

In the fourth embodiment, in a tip portion of the protrusion piece 602, a rectangular cover portion 621 and a pair of flange portions 622 that rise from opposite edge portions of the cover portion 621 are provided. The cover portion 621 covers the axially inner side surface of the inclined portion 287 that extends from the leg portion 281 inserted into one slot 420 adjacent to another slot 420 in which the slot liner 600 is disposed. The flange portion 622 covers a part of a radially outer side surface and a radially inner side surface of the segment conductor 28.

In a step of folding the segment conductor 28 after inserting the segment conductor 28 into the slot 420, the flange portion 622 has a function of restricting a folding direction of the protrusion piece 602 in a case where the inclined portion 287 folds the protrusion piece 602.

A configuration of the bent coil end 61 side is substantially the same as a configuration of the welded coil end 62 ide. In a step of inserting the segment conductor 28 into the slot 420, the flange portion 622 of the protrusion piece 602 disposed on the bent coil end 61 side has a function of restricting a folding direction of the protrusion piece 602 in a case where the inclined portion 283 folds the protrusion piece 602.

According to the fourth embodiment, in addition the same effects as those of the first embodiment, the following effects are exhibited.

(6) In the protrusion piece 602, the cover portion 621 and the flange portion 622 are provided, the cover portion 621 covers a surface (axially inner side surface) of the segment conductor 28 on the stator core 132 side, and the flange portion 622 rises from the cover portion 621 and covers a part of the side surfaces (the radially outer side surface and the radially inner side surface) of the segment conductor 28. As a result, the protrusion piece 602 can be prevented from being folded in an unintended direction. Accordingly, adjacent coils in a coil end can be more reliably insulated from each other.

Fifth Embodiment

A rotary electric machine according to a fifth embodiment will be described with reference to FIGS. 14 and 15. FIG. 14(a) is a diagram illustrating a stator 130E used in the rotary electric machine according to the fifth embodiment, and FIG. 14(b) is a perspective view illustrating the stator core 132 on which end plates 700 are mounted.

As illustrated in FIG. 14, in the stator 130E according to the fifth embodiment, a pair of end plates 700 are provided such that opposite end surfaces of the stator core 132 in the axial direction are interposed therebetween. The endplate 700 is formed in a substantially cylindrical shape by injection molding an insulating resin such as polybutylene terephthalate (PBT) or polyphenylene sulfide (PPS). The end plate 700 includes: an annular main body portion 701; and a plurality of protrusion portions 702 that protrude from the main body portion 701 in the axial direction. In the main body portion 701 of the end plate 700, an opening portion (groove extending in the radial direction of the stator core 132) that is larger than the slot 420 is provided at a position corresponding to each of the slots 420 of the stator core 132. The segment conductor 28 is inserted into each of the opening portions such that the side of the leg portion 281 of the segment conductor 28 is covered. Each of the opening portions has a rectangular shape, and the protrusion portions 702 that extend along the axial direction are provided in each of a pair of long side edge portions of the opening portion that extend in the radial direction of the stator core 132.

FIG. 15(a) is an enlarged view illustrating the welded coil end 62 corresponding to FIG. 10(a). FIG. 15(b) is an enlarged view illustrating the bent coil end 61 corresponding to FIG. 10(b). As illustrated in FIG. 15, in a case where the stator coil 138 is mounted on the stator core 132, each of the protrusion portions 702 supports base portions of the inclined portions 283 and 287 of the segment conductor 28 from the stator core 132 side. The thickness and the protrusion length of each of the protrusion portions 702 is set so as to secure rigidity to the extent that the protrusion portions 702 extending in the axial direction are not folded or bent. Each of the protrusion portions 702 has higher rigidity than the slot liner (not illustrated in FIG. 15).

The pair of end plates 700 are pressed toward the stator core 132 by the inclined portions 283 and 287 of the stator coil 138, respectively, so as to be mounted on and fixed to the stator core 132. One (on the bent coil end 61 side) of the pair of end plates 700 abuts against the inclined portion 283 during the insertion of the segment conductor 28 such that the segment conductor 28 can be aligned relative to the slot 420. That is, the end plate on the bent coil end 61 side has a function as an aligning member during the insertion of the segment conductor 28.

In addition, in a stator including no end plate 700, in a case where the segment conductor 28 is inserted into the slot 420 and bent, the inclined portion 287 may come into contact with an opening edge of the slot 420 of the metal stator core 132 such that the insulating film of the segment conductor 28 is damaged. On the other hand, in the embodiment, in a case where the segment conductor 28 is inserted into the slot 420 and bent, the inclined portion 287 come into contact with an opening edge of the resin end plate 700. Therefore, the insulating film of the segment conductor 28 can be prevented from being damaged.

Further, in a stator including no end plate 700, in a case where vibration is applied to the rotary electric machine 100, an opening edge of the slot 420 and the segment conductor 28 may come into contact with each other such that the insulating film of the segment conductor 28 is damaged. On the other hand, in the embodiment, in a case where vibration is applied to the rotary electric machine 100, an opening edge of the slot 420 of the stator core 132 and the segment conductor 28 do not come into contact with each other. Therefore, even in a case where vibration is applied to the rotary electric machine 100, the insulating film of the segment conductor 28 can be prevented from being damaged.

In the fifth embodiment, the inclined portion 283 and 287 of the segment conductor 28 are supported by the protrusion portions 702. As a result, an axial displacement between the adjacent inclined portions 283 and the 287 can be prevented as compared to a case where the inclined portions 283 and 287 of the segment conductor 28 are not supported. Therefore, a space gap can be more reliably secured.

In addition, as illustrated in FIG. 15, the segment conductor 28 inserted into one slot 420 is supported by the protrusion portions 702 provided in the opening portion of the end plate 700 corresponding to another slot 420 adjacent to the one slot 420. Therefore, the inclined portions 283 and 287 can be supported in positions distant from base portions of the inclined portions 283 and 287. As a result, the bending of the inclined portions 283 and 287 caused by vibration or the like can be effectively suppressed as compared to a case where the segment conductor 28 inserted into one slot 420 is supported by the protrusion portions 702 provided in the opening portion of the end plate 700 corresponding to the same slot 420.

In addition, the present invention is not limited to a case where the protrusion portion 702 is formed to be linear in the axial direction. A protrusion portion as a support structure may be configured using a linear portion that protrudes in the axial direction and inclined portions that are bent from tips of the linear portion and are inclined along the inclined portions 283 and 287.

The following modifications are also within the range of the present invention, and one modification or plural modification examples may be also combined with the embodiments.

Modification Example 1

In the description of the first to fourth embodiments, the slot liner is formed in a substantially rectangular shape. However, the present invention is not limited to this configuration. FIG. 16(a) is a perspective view illustrating a slot liner 800 according to the modification example, and FIG. 16(b) is a cross-sectional plan view schematically illustrating a state where the slot liner 800 according to the modification example is mounted on the slot 420. In FIG. 16(b), the slot 420 and the leg portions 281 of the segment conductors 28 are indicated by two-dot chain lines.

In the description of the above-described embodiments, conductors having the same phase are disposed in one slot 420. However, conductors having different phases may be disposed in one slot 420. In this modification example, conductors constituting two kinds of phase windings are disposed in one slot 420. In this case, as illustrated in FIG. 16(b), the slot liner 800 is folded such that a main body portion 801 of the slot liner 800 has a cross-sectional shape of a substantially B-shape. As a result, every two conductors having the same phase are covered with the slot liner 800.

FIG. 16(c) is a cross-sectional plan view schematically illustrating a state where the slot liner 800 according to another modification example is mounted on the slot 420. As illustrated in FIG. 16(c), two slot liners 800 may be disposed in one slot 420. At a high voltage, insulation improvement may be required not only between different phases to the ground but also between the same phases. In this case, as illustrated in FIG. 16(c), the slot liners 800 are folded such that the main body portions 801 of the slot liners 800 have a cross-sectional shape of a substantially B-shape. As a result, every conductor is covered with the main body portion 801 of the slot liner 800. In addition, even in a case where conductors having different phases in one slot 420 are adjacent to each other one by one, it is preferable that the slot liners 800 having a B-shape in cross-section illustrated in FIG. 16(c) is used.

Modification Example 2

In the description of the example of the embodiments, the flat wire is used as the stator coil 138. However, the present invention is not limited to the embodiments. A wave-winding stator coil 138 may be formed using a round wire.

Modification Example 3

In the fifth embodiment, the protrusion portions 702 of the end plate 700 may have the same flexibility as that of the protrusion pieces described in the first to fourth embodiments. By forming the protrusion portions 702 as foldable thin protrusion pieces and setting the protrusion length to be long, the protrusion pieces may be disposed between the inclined portions 283 and 287 in a coil end.

Various embodiments and modification examples have been described above, but the present invention is not limited to the details thereof. Other aspects conceivable within the technical scope of the present invention are also included in the range of the present invention.

The entire content of the disclosure of the following priority application is incorporated herein by reference.

Japanese Patent Application No. 2015-249370 (filed on Dec. 22, 2015)

REFERENCE SIGNS LIST

3: magnetic pole sensor
10: case
12: bolt
28: segment conductor
31: first inverter
32: second inverter
33: control unit
51: first winding unit
52: second winding unit
61: bent coil end
62: welded coil end
100: rotary electric machine
112: housing
115: flange
118: shaft
130: stator
130E: stator
132: stator core
138: stator coil
140: coil end
150: rotor
152: rotor core
154: permanent magnet
200: driving portion
280e: welding end portion
281: leg portion
282: top portion
283: inclined portion
284: bent portion
285: bent portion
286: bent portion
287: inclined portion
288: alternating current terminal
289: connection portion
300: slot liner
301: main body portion
302: protrusion piece
302L: first protrusion piece
302S: second protrusion piece
311: long side portion
312: short side portion
400: slot liner
402L: first protrusion piece 402S: second protrusion piece
420: slot
430: teeth
440: core back
500: slot liner
502: protrusion piece
521: folded portion
600: slot liner
602: protrusion piece
621: cover portion
622: flange portion
700: end plate
701: main body portion
702: protrusion portion
800: slot liner
801: main body portion

The invention claimed is:

1. A stator comprising:
a stator core that includes a plurality of slots;
a stator coil that is formed by connecting a plurality of segment conductors to each other; and
an insulating member that has insulating properties, wherein
the segment conductor includes a slot portion and an inclined portion,
the slot portion is disposed inside the slot,
the inclined portion is disposed outside the slot to be inclined from the slot portion,
the insulating member is mounted on the stator core and includes a first insulating portion and a plurality of second insulating portions,
the first insulating portion is disposed next to the slot portion,
the plurality of second insulating portions extend from the first insulating portion in an axial direction and are provided along a radial direction of the stator core,
the second insulating portions insulate adjacent segment conductors in a coil end from each other,
a cover portion and a flange portion are provided on each of the second insulating portions,
each cover portion respectively covers a surface of the segment conductor on a stator core side, and
each flange portion rises from the cover portion and covers respective parts of side surfaces of the segment conductor.

2. The stator according to claim 1, wherein
the second insulating portions are respectively disposed between the inclined portion of one segment conductor and the inclined portion of another segment conductor adjacent to the one segment conductor.

3. The stator according to claim 2, wherein
the plurality of second insulating portions that are provided along the radial direction are alternately inclined to one side and the other side in a circumferential direction.

4. The stator according to claim 1, wherein
the insulating member is a slot liner that insulates the slot and the segment conductor from each other,
the first insulating portion is disposed inside the slot, and
the second insulating portions are respectively disposed outside the slot.

5. The stator according to claim 1, wherein
the insulating member is a slot liner that insulates the slot and the segment conductor from each other, and
the second insulating portion of the slot liner disposed in one slot and the second insulating portion of the slot liner of another slot adjacent to the one slot are disposed between the inclined portion of the segment conductor disposed in the one slot and the inclined portion of the segment conductor disposed in the another slot.

6. The stator according to claim 1, wherein
a multi-layer portion where a plurality of insulating papers overlap each other is provided in an end portion of the second insulating portion.

7. The stator according to claim 1, wherein
the first insulating portion is an end plate that is disposed in an end portion of the stator core, and
the second insulating portions protrude from the first insulating portion along a central axis direction of the stator.

8. A rotary electric machine comprising:
the stator according to claim 1, and
a rotor that is disposed to be rotatable with respect to the stator core with a gap therebetween.

9. A stator comprising:
a stator core that includes a plurality of slots;
a stator coil that is formed by connecting a plurality of segment conductors to each other; and
an insulating member that has insulating properties, wherein
the segment conductor includes a slot portion and an inclined portion,
the slot portion is disposed inside the slot,
the inclined portion is disposed outside the slot to be inclined from the slot portion,
the insulating member is mounted on the stator core and includes a first insulating portion and a plurality of second insulating portions,
the first insulating portion is disposed next to the slot portion,
the plurality of second insulating portions extend from the first insulating portion in an axial direction and are provided along a radial direction of the stator core,
the second insulating portions insulate adjacent segment conductors in a coil end from each other, and
each second insulating portion respectively supports the inclined portion of the segment conductor.

* * * * *